United States Patent
Seely

(10) Patent No.: US 10,624,041 B1
(45) Date of Patent: Apr. 14, 2020

(54) PACKET ERROR RATE ESTIMATOR FOR A RADIO

(71) Applicant: Itron, Inc., Liberty Lake, WA (US)

(72) Inventor: Danny Ray Seely, Spokane Valley, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 16/397,963

(22) Filed: Apr. 29, 2019

(51) Int. Cl.
| | |
|---|---|
| H04L 25/38 | (2006.01) |
| H04L 27/06 | (2006.01) |
| H04W 52/20 | (2009.01) |
| H04W 28/04 | (2009.01) |
| H04W 72/08 | (2009.01) |
| H04L 1/20 | (2006.01) |

(52) U.S. Cl.
CPC ............... H04W 52/20 (2013.01); H04L 1/20 (2013.01); H04W 28/04 (2013.01); H04W 72/082 (2013.01)

(58) Field of Classification Search
CPC .......................... H04B 1/1027; H04W 24/10
USPC ............... 455/69, 522, 67.11; 370/335, 369; 375/149, 147, 343, 369
See application file for complete search history.

(56) References Cited

U.S. PATENT DOCUMENTS

| | | | | |
|---|---|---|---|---|
| 6,314,129 B1 * | 11/2001 | Sunwoo | ............... | H04B 1/7085 375/149 |
| 6,707,805 B2 * | 3/2004 | Ozluturk | ............... | H04B 1/707 370/335 |
| 7,020,111 B2 * | 3/2006 | Ozluturk | ............... | G06F 13/374 370/335 |
| 8,014,270 B2 | 9/2011 | Halford et al. | | |
| 8,958,506 B2 | 2/2015 | Seely | | |
| 2001/0030991 A1 * | 10/2001 | Imai | ..................... | H04B 1/1027 375/145 |
| 2002/0186753 A1 * | 12/2002 | Kolze | ..................... | H04B 1/71 375/147 |

(Continued)

FOREIGN PATENT DOCUMENTS

| | | |
|---|---|---|
| WO | WO2005083943 | 9/2005 |
| WO | WO2014131036 | 8/2014 |

OTHER PUBLICATIONS

Office Action for U.S. Appl. No. 15/443,495, dated Apr. 20, 2018, Seely, "Radio with Dynamically Controlled Correlation Threshold", 38 pages.

(Continued)

*Primary Examiner* — Tan H Trinh
(74) *Attorney, Agent, or Firm* — Lee & Hayes, P.C.

(57) ABSTRACT

A packet error rate estimator is configured to estimate packet error rate (PER). In an example, power or energy is calculated in one or more streams of I/Q samples over a period of time. The power or energy may be calculated for periods of time, e.g., bit-length periods of time, and a maximum value of bit-length power or energy may be selected over a packet-length period of time. The maximum power or energy associated with each stream of I/Q samples over the period of time may be compared to at least two threshold values. Each threshold value may be associated with an expected PER. Based at least in part on the comparing, and which of a plurality of threshold vales were (or were not) exceeded, a PER may be estimated for each stream of I/Q samples. The PER may be used to select a channel plan with less radio frequency noise.

20 Claims, 16 Drawing Sheets

(56) References Cited

U.S. PATENT DOCUMENTS

| | | |
|---|---|---|
| 2004/0081205 A1 | 4/2004 | Coulson |
| 2005/0266803 A1* | 12/2005 | Dinur .................... H04B 1/1027 |
| | | 455/67.11 |
| 2006/0140314 A1* | 6/2006 | Kim ...................... H04B 1/7077 |
| | | 375/343 |
| 2007/0060162 A1 | 3/2007 | Xhafa et al. |
| 2007/0133728 A1* | 6/2007 | Bahng ................. H04L 27/2656 |
| | | 375/369 |
| 2008/0304604 A1* | 12/2008 | Oh .......................... H04L 7/042 |
| | | 375/345 |
| 2009/0003308 A1 | 1/2009 | Baxley et al. |
| 2010/0107042 A1* | 4/2010 | Sawai ................. H04L 27/2655 |
| | | 714/799 |
| 2011/0096685 A1 | 4/2011 | Lee et al. |
| 2014/0241178 A1 | 8/2014 | Seely et al. |
| 2015/0139008 A1 | 5/2015 | Meilhac et al. |
| 2017/0041878 A1* | 2/2017 | He ....................... H04B 7/0877 |
| 2018/0248681 A1 | 8/2018 | Seely et al. |

OTHER PUBLICATIONS

PCT Search Report and Written Opinion dated Jun. 1, 2018 for PCT Application No. PCT/US18/19778, 11 pages.

\* cited by examiner

PACKET ERROR RATE ESTIMATOR FOR A RADIO

BACKGROUND

Acceptable read reliability performance can be difficult to attain within a crowded radio frequency (RF) band. When significant levels of spectral competition exist, the RF channels can be jammed, which may result in a critical disruption of the operation of the network. Not only can every local area look different, but interference signatures are constantly evolving as users look for, and move to, cleaner spectrum. The chronic and evolutionary nature of RF spectrum makes a one-time site evaluation inadequate. Accordingly, channel assessment may be difficult in areas with significant RF noise.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
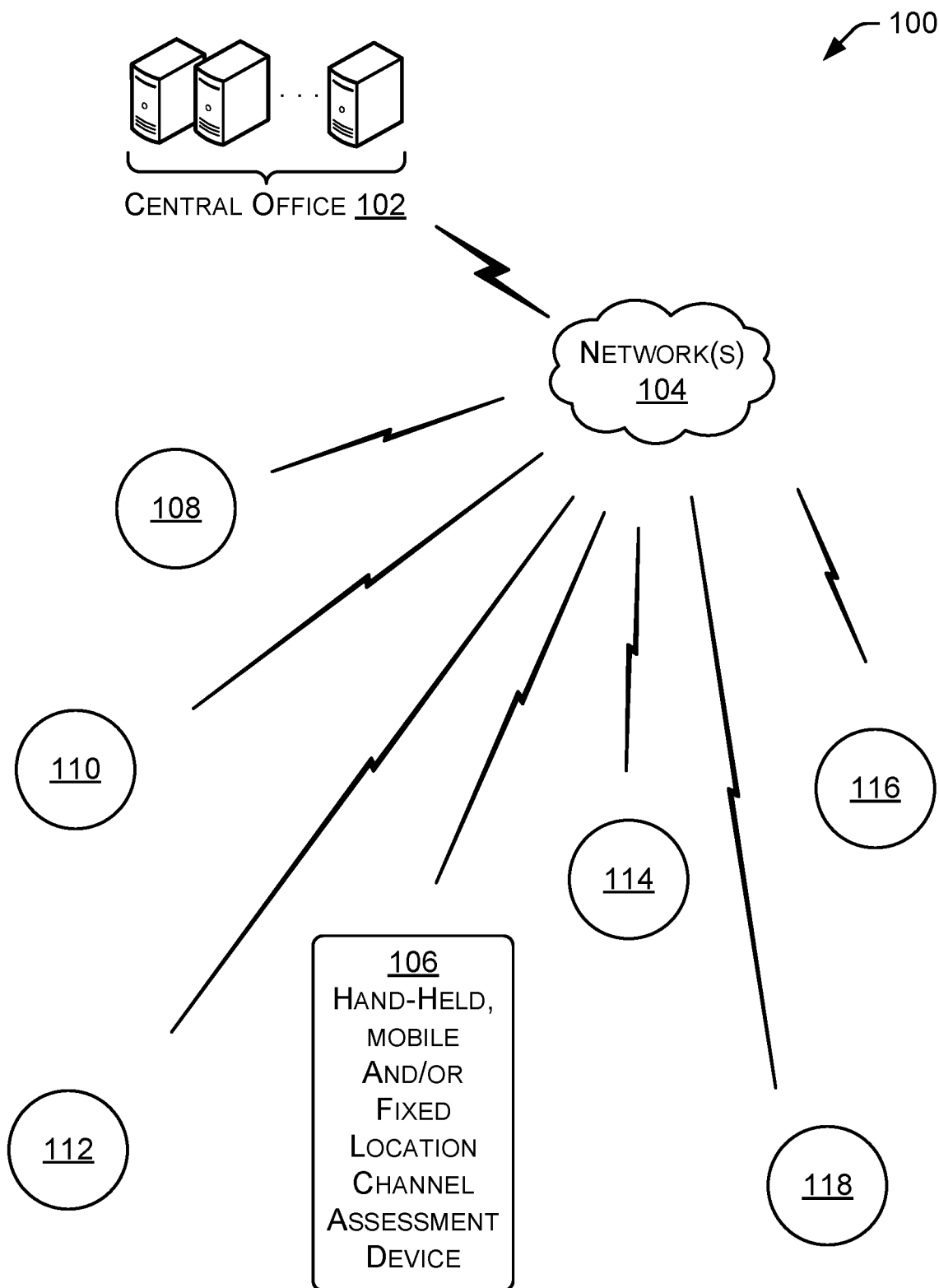
FIG. 1 is a block diagram showing a system within which channel assessment is performed and packet error rate (PER) is estimated.

When operating a radio in an unlicensed band (i.e., radio frequency (RF) spectrum whose use is less regulated and/or restricted), it is challenging to meet an expected or targeted read reliability performance level. When significant levels of spectral competition exist, the RF channels can be effectively jammed, which critically disrupts the operation of a network. Not only can every deployment site (e.g., city, county, etc.) look different, but an interference signature of the spectral competition is constantly evolving as use of the spectrum changes and/or increases. This chronic situation makes it impractical to rely on a one-time site evaluation for defining an appropriate channel plan. To utilize the cleanest spectrum in the unlicensed band, an ongoing channel assessment tool is required which can be used for adapting or changing a channel plan that in use as the interference signature evolves.

Example Channel Assessment

An example channel assessment tool (CAT) operates in the background (without interfering with "regular" radio use) and non-intrusively measures the read reliability for the entire spectrum without disrupting the reception of normal packet activity in an active network. This allows the Layer 1/Layer 2/Layer 3 (L1/L2/L3) protocol to freely operate without complex synchronized coordination of shared hardware resources. These techniques reduce any negative impact on the throughput of the network.

In an example, the CAT will simultaneously and continuously assess all channels, collecting statistical read reliability information that can be used for adaptively updating channel plans as indicated by the evolving RF interference signature. In an example, there can be multiple CAT services running, one for each physical layer (PHY) mode with different channel plans without any synchronization between them. In a significant reduction in power, and circuit-design cost, a CAT engine does not require decoders, and is able to take advantage of pre-existing channelizers being used by the normal operation of the receiver. Therefore, the additional fabric required to implement a CAT engine in a field programmable gate array (FPGA) and/or an application specific integrated circuit (ASIC) is relatively small. In a radio having a half-duplex design, the CAT engine may be configured to automatically go into an idle mode whenever the radio is in a transmission (TX) mode and then resume operation once receive (RX) mode is active. The CAT engine will also accommodate the automatic gain control (AGC) operation (e.g., an AGC manager 128) of the radio if any upstream ranging attenuators/amplifiers are changed.

Having continuous read reliability channel assessment capability built into the radio architecture ensures optimum channel allocation will be maintained over time by adapting to the evolving interference signature. This technology is critical for optimal use of the precious RF spectrum, especially in unlicensed bands where congestion is a chronic problem.

In some examples, multiple CAT services may run simultaneously (e.g., with multiple tools/operations running simultaneously within an FPGA and/or a processor). Accordingly, if adaptive channel planning is needed for multiple PHY modes, this can be accomplished by instantiating another CAT engine that is configured for that PHY mode. Since there is no synchronization required between the CAT engines, they can operate autonomously with respect to each other.

Example Packet Error Rate Estimation

In an example, a channel assessment tool (CAT) service may include a broadband digitizer and a packet error rate (PER) estimator. The broadband digitizer enables some or all of the following. In a first example, an entire radio band is digitized enabling all channels to be evaluated simultaneously. In a second example, channel-to-channel blocking is implemented, eliminating adjacent channel signals from leaking across channel boundaries and compromising the accuracy of the assessment. In a third example, a plurality of channels can be evaluated simultaneously and continuously. Because a plurality of channels may be evaluated simultaneously, the impact of a random burst of interference signals is evaluated. In contrast, if the channels were not evaluated simultaneously, the random burst of interference might be missed. In a fourth example, assessment of a plurality of channels can be accomplished without disrupting the reception of normal packet activity in an active network. In a fifth example, a CAT service may be used to support both full-duplex and half-duplex radio systems. To prevent tainted assessments for half-duplex radios that are in TX mode, this service will automatically move to an idle state until RX mode has been reestablished. In a sixth example, a CAT service reuses some receiver hardware that is used for normal network operation so any intrinsic receiver impairments (e.g. noise figure, linearity, etc.) will be included in the assessment. Accordingly, problems with a radio's reception are factored into channel assessment, resulting in expected performance when dealing with particular channel noise. The additional new resources that are unique for channel assessment are insignificant resulting in no perceivable radio cost or power dissipation. In a seventh example, multiple channel plans associated with different physical layer modes can be simultaneously supported without requiring any complex synchronization.

In an example, a channel assessor and/or a packet error rate (PER) estimator enables some or all of the following. The terms "channel assessor" and "packet error rate (PER) estimator" are used to refer to channel assessment generally, and a more specific means of assessment, i.e., PER estimation, respectively. In a first example, an estimation algorithm will support any practical packet length. In a second example, the estimator may be configured with an extremely large instantaneous linear dynamic range (e.g., greater than 70 dB), allowing an entire PER curve vs. level to be simultaneously constructed without requiring any hardware changes. In a third example, estimation may be made in real-time and continuous and indefinite monitoring is possible. In a fourth example, accurate PER estimation is effective for any interference signatures, from white noise to random burst interference. In a fifth example, the PER estimator works seamlessly with AGC that is controlled by other entities in the radio, allowing the instantaneous linear dynamic range to be naturally centered. In a sixth example, statistical monitoring of the PER estimator results can be used by the personal area network (PAN) coordinator for channel ranking. The ranking allows the radio network protocol to adaptively optimize a channel plan based on the evolving interference signature. In a seventh example, statistical monitoring of the PER estimator results will enable trend-analysis of the evolving interference signatures and could generate alarms providing early detection to the field network director (FND) of RF traffic congestion. In an example, the FND may be configured as an entity at the head-end system and may monitor all or part of the network. The FND can also be used to profile network capacity for an entire field area network (FAN). In an eighth example, field test tools can use this technology for extensive site evaluation that can be used for determining best radio deployment locations and link margin evaluations. In a ninth example, placing a PER instance on each channel allows simultaneous evaluation for all channels. Accordingly, in a tenth example, the design of the PER estimator is efficient, easily extensible, and the implementation takes little additional resources, such as for design and implementation. The PER estimator may provide a low-cost solution that provides PER estimation and/or information.

Example System and Techniques

FIG. 1, shows a system 100 within which channel assessment is performed and packet error rate (PER) is estimated. A central office 102 may communicate over network(s) 104 with a plurality of network nodes 108-116. The central office and/or head-end system 102 may include a field network director (FND), which may be configured as an entity within the head-end system and configured to monitor all or part of the network.

The network(s) 104 may include technologies including the internet, a cellular network, a mesh network, a wired network, a wireless network, a powerline communication network, or other communication network. The networked devices (represented in the example of FIG. 1 by network nodes 108-116) may be any type of networked device, such as utility meters (gas, water, electric, etc.), point of sale devices, internet of things devices, etc.

A channel assessment device 106 may be configured to assess channels defined in spectrum within the network 100. The device 106 may be configured with a channel assessment tool (CAT) or engine, which allows it to simultaneously assess interference (e.g., noise and/or transmissions of other organizations) within a region of the system 100. The CAT engine could be integrated into a radio(s) of the channel assessment device 106 and would be configured with appropriate hardware, software and/or services to implement and support the CAT algorithm and techniques. Accordingly, the channel assessment tool of FIG. 1 is one example of a radio within which the CAT engine may be utilized. The CAT engine may be configured for channel assessment, and in some examples includes packet error estimation (PER)

techniques that obviate the need to decode packets to determine a level of read reliability.

Example Channel Assessment

Figure 2:
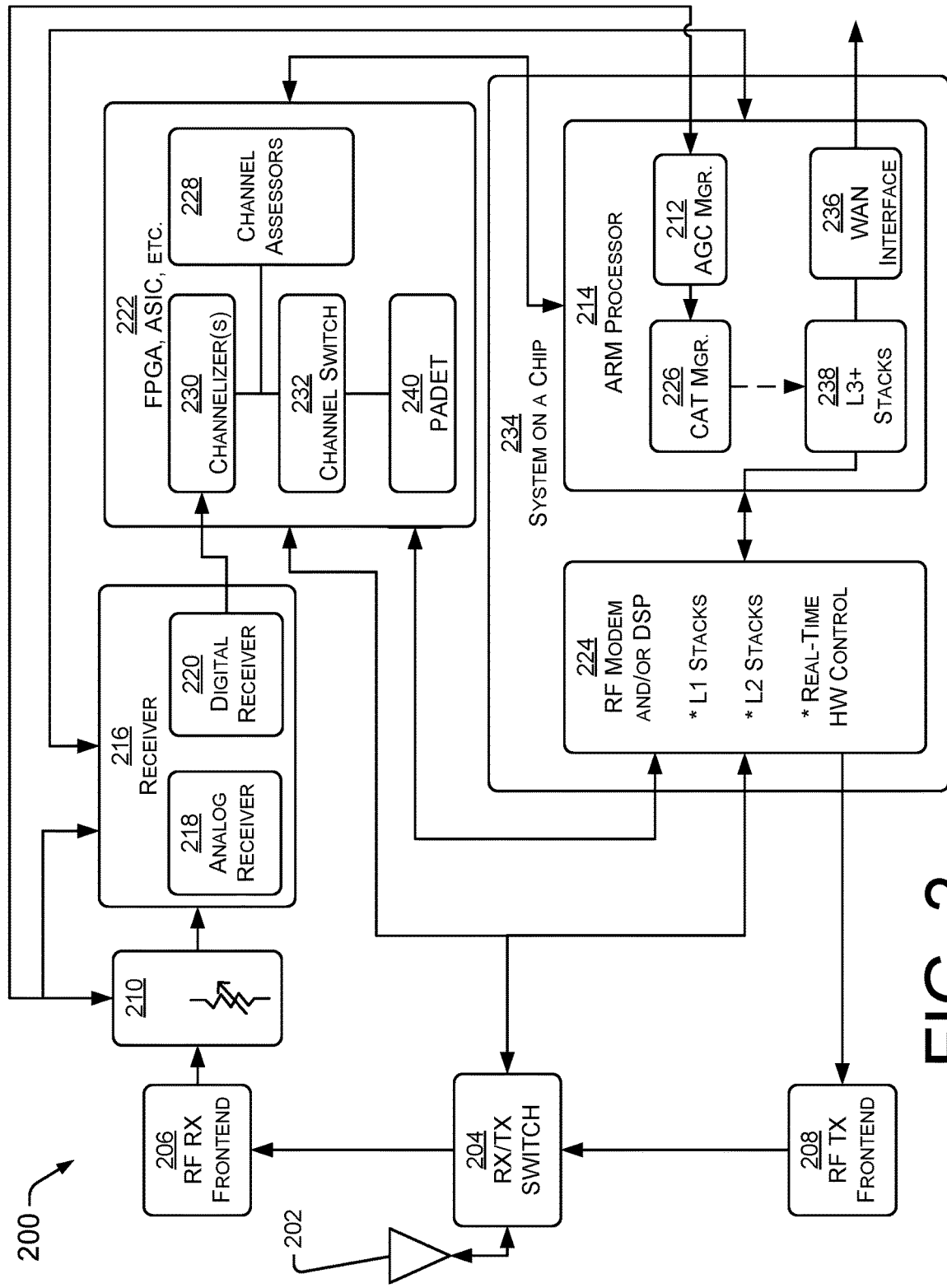
FIG. 2 is a block diagram showing a first example radio having a digital signal processor (DSP) and an ARM processor configured to perform packet error estimation and/or channel assessment techniques.

FIG. 2 shows a number of devices and features that operate synergistically within an example channel assessment tool (CAT) engine. The example CAT engine of FIG. 2 is a two-processor implementation, having a digital signal processor (DSP) and an ARM processor. The antenna 202 is connected to a RX/TX switch 204, which routes signals to the RF RX frontend 206 in the receive (RX) mode, or from the RF transmit (TX) frontend 208 in RF in transmit (TX) mode. The RF RX frontend 206 includes several filter stages that are designed to attenuate the out-of-band signals so that the succeeding stages are not over-driven. Several low noise amplifiers (LNA) may be interleaved between these filters. The LNAs may be designed to have a low noise figure and high IIP3 (i.e., input to third-order intercept point), to achieve a targeted sensitivity specification(s) along with minimizing de-sense caused by both out-of-band and in-band interference. The RF frontend 206 passed the filter/amplified signal to a ranging attenuator 210, which may be controlled by the automatic gain control (AGC) 212 algorithm running in the advanced RISC (reduced instruction set computer) machine (ARM) processor 214. The attenuator 210 may be used to support extremely high-power signals when presented at the input of the radio. The next stage is a receiver 216 (or the receiver portion of a transceiver). The receiver 216 may include ranging attenuators that are used in conjunction with the preceding attenuator step to fulfill the full range of the AGC 212. One role of the receiver 216 is to receive the targeted radio band and digitize it into streaming I/Q signals. The transceiver may include mixers, analog filters, I/Q ADCs and several decimating filter stages. In an example, an analog receiver and/or analog receiver components 218, and a digital receiver and/or digital receiver components 220 are provided. A custom finite impulse response (FIR) may be downloaded in the transceiver 216 to improve the out-of-band blocking capability which augments the RF bandpass filters found in the RX RF frontend 206. The transceiver streams the I/Q signals to the field programmable gate array (FPGA) 222. The FPGA 222 may implement a high-performance digital receiver, which supports fast channel hopping, exceptional in-band/channel filtering, down-sampling, and preamble detection. Once a positive preamble is detected, an interrupt is sent to the digital signal processor (DSP) processor to fetch the I/Q samples. Final demodulation and packet construction may be completed on the DSP (e.g., ARM processor 214), such as by firmware. From there, the L1/L2 stacks (e.g., in the RF modem 224 communicate with the L3+ stacks 238 found in the ARM processor 214. The RF TX chain is not relevant for CAT. However, the RX/TX control does play an important role. A control line for the RX/TX switch 204 is also routed to the FPGA 222. This signal is how the algorithm of the CAT manager 226 knows when the RX mode is enabled. When TX mode is enabled, the algorithm of the CAT manager 226 places channel assessment in an idle state.

The CAT service has two primary components (e.g., the CAT manager 226 and one or more channel assessors 228). In an example, the channel assessors 228 run in the FPGA 222 (or application specific integrated circuit (ASIC), processor, memory, etc.) while the CAT manager 226 runs in the ARM processor 214. The channel assessors 228 receive output from the channelizers 230 found in the FPGA 222 but prior to channel selector switch controller 232. When adding a CAT to a radio, it is important to recognize that the PER estimators need to be located after the radio noise figure (NF) has been set and the in-band and out-of-band filtering are in place. This assists in the accurate estimation of the PER. Once the channel assessors 228 are enabled, they will continuously calculate the packet-error-rate until being reset. These channel assessors 228 are controlled by the CAT manager 226 that runs in the ARM processor 214. The CAT manager 226 will periodically collect the data from the channel assessors 228 and reset them for a new collection interval.

The CAT manager 226 builds the statistical database for all channels. This database is used to identify the best channels over that collection period, which may be used to build a new channel plan. L3 stacks 238 use the CAT statistical database to generate a new active channel plan which may be updated across the entire network (e.g., personal area network (PAN)). In the example shown, the RF modem 224 and the ARM processor 214 are located on a system on a chip 234. A WAN interface 236 may be configured on the system on a chip 234 to communicate with a wide area network.

Once the radio has been booted and configured for operation, the only changes to hardware that occurs upstream from the channel assessors 228 occurs at the AGC ranging attenuators 210 and the RX/TX switch 204. Therefore, the CAT manager 226 will need to subscribe to AGC ranging attenuators 210 to update the PER thresholds. This subscription occurs in the ARM processer 214, where the AGC manager 212 exists. All channel hopping occurs downstream of the channel assessors 228 and therefore has no impact on the operation. For a half-duplex radio, it makes no sense to collect PER statistics while in TX mode. Therefore, the channel assessors 228 are automatically placed into an idle mode anytime TX mode is active.

There is a Preamble Detector (PADET) used in the FPGA to provide early detection for a potential incoming packet. If the PADET triggers a positive detection, then the I/Q sample stream for that specific channel is routed to the DSP, where the final decoding operation is completed.

Figure 3:
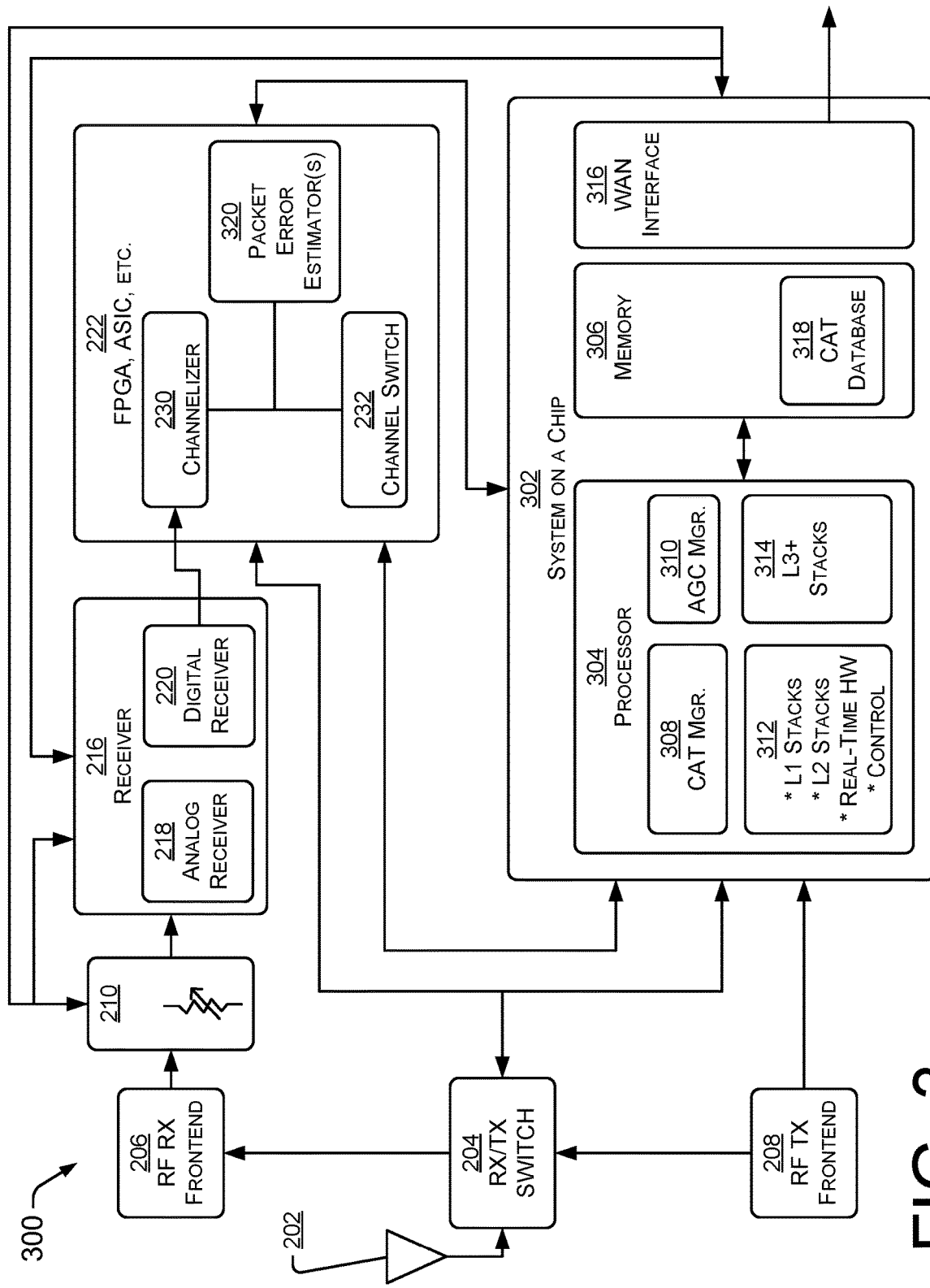
FIG. 3 is a block diagram showing a first example radio having a processor and a memory device configured to perform packet error estimation and/or channel assessment techniques.

FIG. 3 shows a second example radio 300 having packet error estimation and channel assessment features. The example is a one-processor implementation, with a system on a chip 302 having a processor 304 with instructions and/or data defined on an associated memory device 306. Accordingly, the example radio 300 differs from the radio 200 of FIG. 2 at least in that the system on a chip 302 is differently configured. The processor 304 may perform tasks related to the operation of a CAT manager 308, an AGC manager 310, and/or stacks and real-time hardware control 312, 314. Such performances may be based on hardware-defined modules and/or may be based on software stored in the memory device 306. A WAN interface 316 may also be present on the system on a chip 302.

FIG. 3 also shows packet error estimators 320. One or more packet error estimators 320 may perform channel assessment tasks, which may include packet error estimation. In examples, the packet error rate (PER) may be estimated, rather than measured. In such examples, the PER may be estimated without actually decoding packets and looking at good packets and failed (error) packets.

Figure 4:
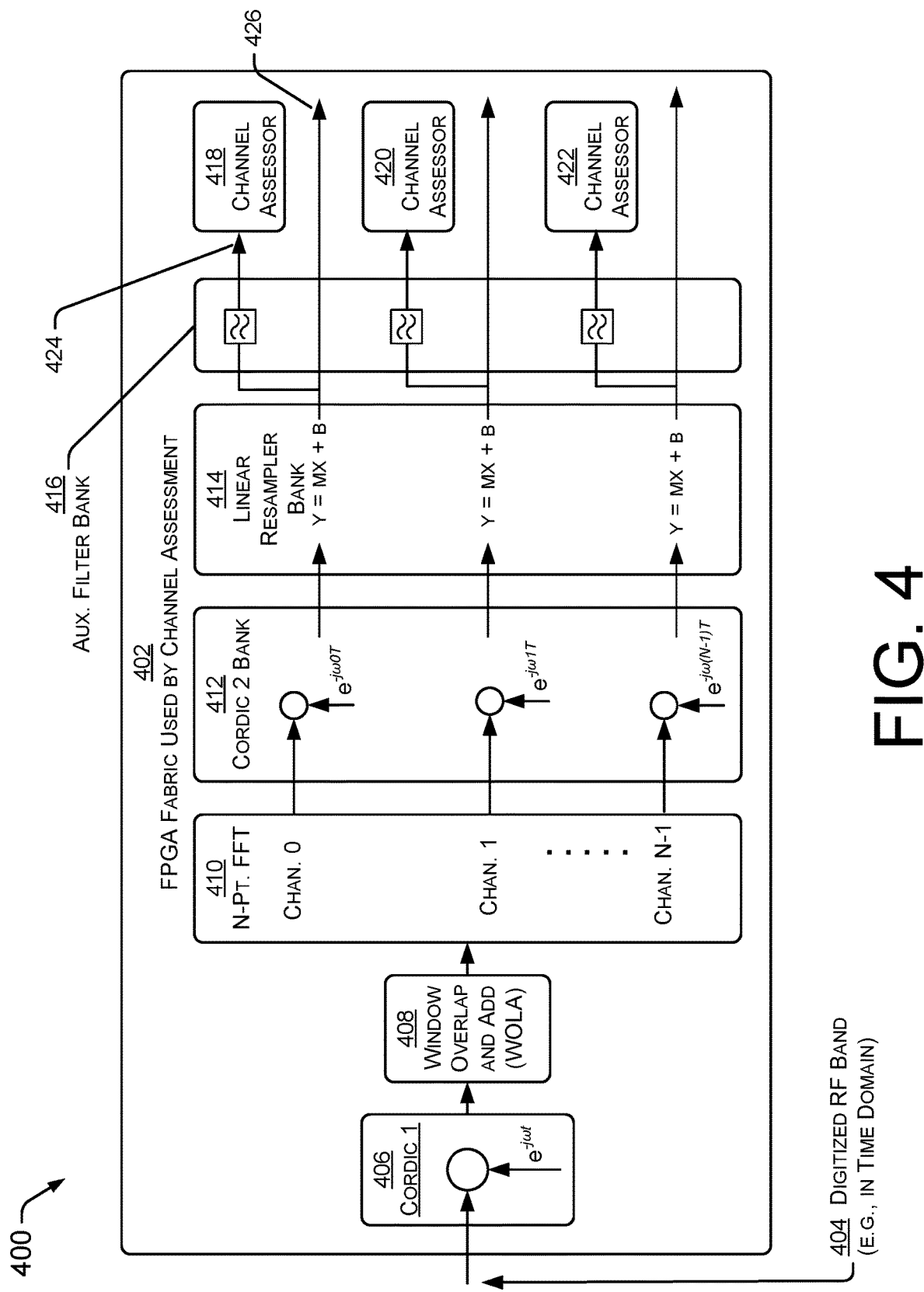
FIG. 4 is a block diagram showing example channelizers and channel assessors, which in an example function as PER estimators.

FIG. 4 shows a further example of a radio 400 having an FPGA 402 including channelizers and channel assessors, which in some implementations may be configured as packet error estimator(s). In the example, the packet error estimator(s) may provide input to the CAT. In the example shown, the components are defined in the FPGA 402, but could be executed by an ASIC, a processor and memory, or other hardware and/or software device. In the example, most of the fabric of the FPGA 402 is reused (or shared) with the active reception of packets by the radio. Only the channel assessors and/or packet error estimators are unique to the CAT service.

The input signal 404 to the FPGA 402 may be a digitized representation of an entire RF band. The representation may be defined in the time domain and may include one or more channels usable to form one or more channel plans. In a single-decoder example radio, a radio band may include sufficient RF spectrum to define at least two channels according to at least one modulation scheme. In some examples, the band may include one or more channels for each of one or more modulation schemes. The digitized signal not only includes the signals and/or interference due at least in part to competing systems operating in that band, but also includes the wanted packets of the active network. The wanted packets will cause collisions in a manner similar to the unwanted interference. Excessive numbers of desired packets can be referred to as self-interference. Ideally the protocol methodology will minimize/manage the intrinsic self-interference exposure. The CAT techniques take the entire RF signature (including the self-interference) into account when assessing the channel statistics.

The input signal 404 may be provided to a complex mixer 406 (e.g., CORDIC 1) aligns the received radio band needs to fast Fourier transform (FFT) bins. The output of the complex mixer 406 may be sent to a window overlap and add (WOLA) function 408, which may serve two primary purposes. The WOLA 408 windows and resamples the incoming data. Windowing is a mathematical function that is zero-valued outside a chosen interval.

The CAT may be more effective if the channelizer used provides in-band blocking. In an example, a channelizer may support ≥70 dB rejection at 50 kHz offsets and ≥80 dB rejection at 100 kHz offsets. If the radio design did not support effective in-band blocking, the effectiveness of channel assessment techniques would be limited. The output of the channelizer is connected to the decoders and the channel assessors (or PER estimators, if utilized). If the radio used is a single-channel radio, it will have only one decoder. Therefore, there is a channel selection switch (not shown) used to provide real-time channel hopping as prescribed by L2.

The channel assessors (in one example, PER estimators) operate independently of the channel hopping sequence and therefore require no synchronization with the L1/L2 operation of the radio. In an example, there is a channel assessor/PER estimator attached to each of the streaming I/Q channel coming from the channelizer. If the radio is in RX Mode, the channel assessors/PER estimators are calculating channel noise levels and/or PER performance.

The channelizer block may receive an I/Q sample stream from a receiver that contains the entire radio band and may translate it into many parallel streams. Each stream has been down-converted to I/Q baseband samples which are filtered and resampled. This block may be very flexible and may support an arbitrary sample rate and bandwidth as required by the modulation scheme(s). The channelizer may include an optional front-end complex mixer, window overlap and add (WOLA) block 408, fast Fourier transformation (FFT) block 408, an optional second complex mixer bank 412, an optional re-sampler bank 414, and an option auxiliary filter bank 416.

The complex mixer 406 (e.g., CORDIC 1) is an optional block and is only required if the received radio band needs to be aligned with the FFT bins. The output of the complex mixer 304 is sent to the WOLA block 306. The WOLA function will serve two primary purposes, including windowing (zeroing values outside the window) and resampling the incoming data.

Figure 5:
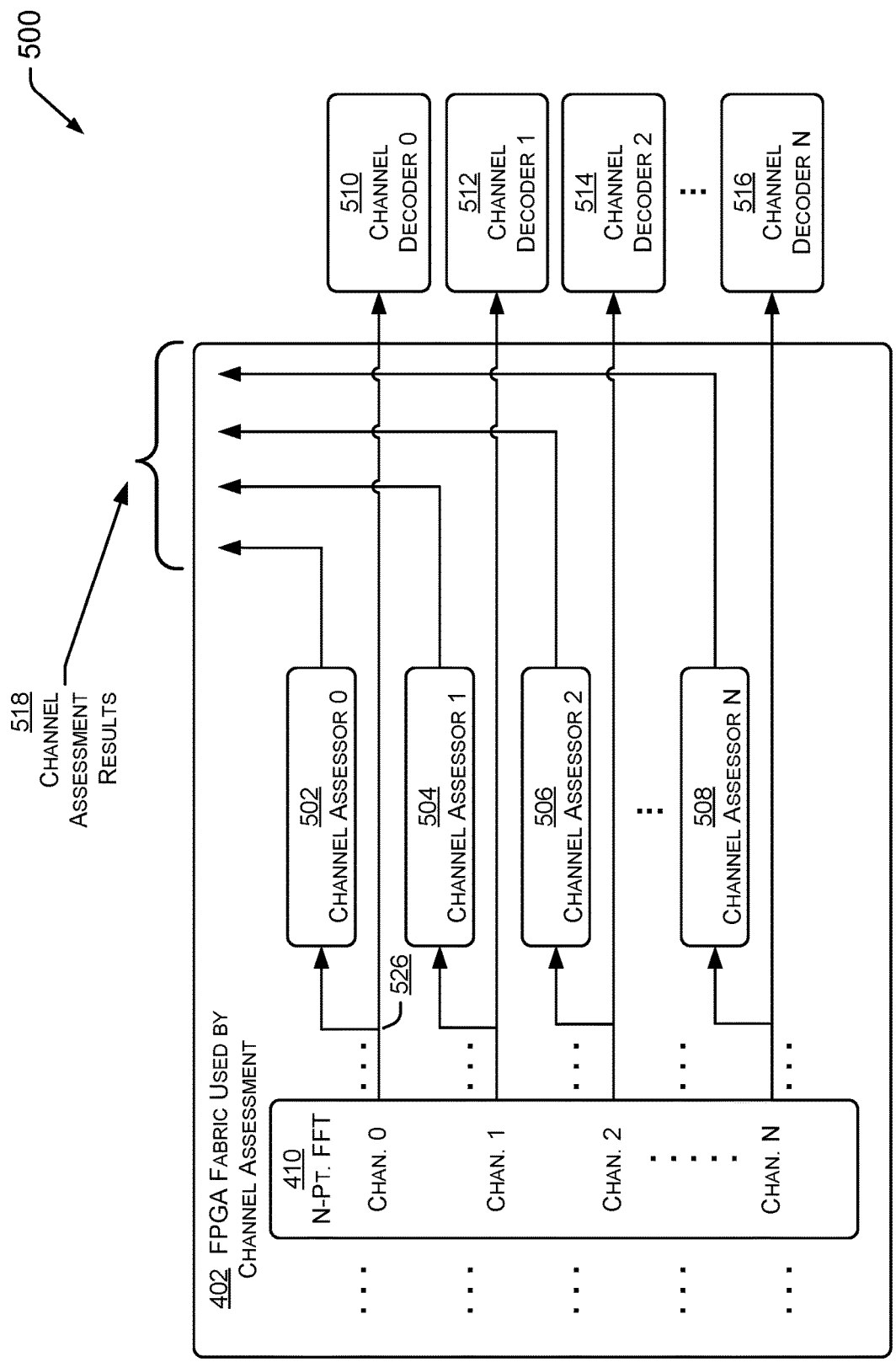
FIG. 5 is a block diagram showing example channel assessors and modulation decoders.

These operations will prevent amplitude and phase discontinuities from occurring between the first and last samples, which is a prerequisite for the high-dynamic range channelization algorithm provided by the FFT process. Without windowing, there would be significant bin to bin leakage in the FFT process, which results in reduced selectivity. By controlling the number of I/Q samples that are shifted into the WOLA block 408, the samples can be effectively resampled. The resampling process assists in the translation of the ADC sample rate to a much lower rate such that the output of the N-point FFT block 410 will be at or close to the desired sample rate required by the decoder. The output of the FFT block 410 is parallel streaming channels that are aligned with the targeted channel plan. Depending on the resampling associated with the bit shifting process in the WOLA block 408, there may be a frequency shift found in each output FFT bin. If that is the case, then the frequency shift should be corrected. That correction occurs in the mixer bank (CORDIC 2) 412 following the FFT block 410. The CORDIC 2 bank 412 is optional, since this frequency shift can be avoided by selecting a cardinal WOLA shift rate. If the resampling rate on the output of the FFT is not at the targeted rate required by the decoder, then it can be adjusted in the re-sampler bank 414. The re-sampler bank 414 is also optional since it is only needed if the output sample rate of the FFT 410 needs to be adjusted. Downstream decoders (shown in other figures) may provide additional filtering which will further reduce the bandwidth. To ensure the channel assessors or PER estimators are processing samples that match the filter bandwidth of the downstream decoder, there is an optional auxiliary filter block 416 that exists only in the channel assessor or PER estimator path to handle that scenario. Finally, the I/Q samples are piped to the decoder (e.g., as seen in FIG. 5) for demodulation.

A complex mixer 406 may be helpful on the front-end if the targeted channels found in the received RF Band are not aligned with the downstream FFT bins. The purpose of the complex digital mixer 406 is to shift the frequency spectrum such that the channels are centered in the downstream FFT output bins. When there is only one channelizer found in the FFT 410 (in contrast to examples shown in other figures having multiple and/or shared channelizers in multiple PHY modes), the RF LO found in the RX RFIC would typically be tuned such that mixer 406 would not be necessary. Ideally, it is best to not have mixer 406 because of the extra FPGA resources and increased power dissipation, especially since it would be typically operating at very high sample rates. However, if multiple channelizers are required, then the RX RFIC LO frequency may not satisfy the alignment of both channelizers. In that situation, complex mixer 406 can be used.

A CORDIC (COordinate Rotation DIgital Computer) may be used for implementing the complex mixer 406 and 412. A CORDIC is an efficient algorithm that can be implemented with addition, subtraction, bit shifting, and table lookup operations. CORDICs have been generalized for calculating hyperbolic and exponential functions, logarithms, multiplications, divisions, and square roots. The multiplication function makes it ideally suited for frequency rotation (aka mixer). Using a CORDIC as a mixer has some clear advantages over a classic mixer design. It does not require a complex local oscillator or any multipliers which is valuable for a FPGA implementation.

In some examples, the downstream decoders may provide additional filtering, which would further reduce the bandwidth of the channelized I/Q samples. The accuracy of the channel assessor(s) or PER estimator(s) is dependent on the I/Q bandwidths being matched between the decoder(s) and PER estimator(s). If this scenario exists, an auxiliary filter 416 may be implemented in the channel assessor or PER estimator path. The bandwidth of auxiliary filter 416 should match any downstream filtering such as channel optimizations filters found in the decoders and preferably reuse the same filter design.

A plurality of channel assessors 418-422 may be used to assess channel quality for a plurality of channels defined in an RF spectrum. In an example of channel assessment, statistics may be kept on markers of channel quality over time. The statistics may be compared across channels to determine the best channels for packet reception. The statistics may be used to determine a channel plan to be used by a node and/or all or part of a network. The statistics may be used for assessment of a network and any need for upgraded and/or changed equipment, added and/or changed RF spectrum, or other issues. The statistics may be maintained over time, updated continuously and/or at intervals, uploaded to other devices and/or network headend(s), and otherwise utilized.

In an example, the data stream is channelized to define a plurality of channels including the first channel, the second channel, and a plurality of additional channels. Channel assessment is performed on the plurality of channels. Packets are decoded only a subset of the plurality of channels. When channels that are quieter than the currently used channels are identified, those channels may be used instead of the current channels.

In an example, two or more channels may be assessed simultaneously. At least one of the two or more channels may be decoded according to operation of a decoder using a same I/Q stream as presented, simultaneously, to a respective channel assessor.

FIG. 5 shows example portions 500 of a radio including channel assessors 502-508 and decoders 510-516. While a plurality of decoders is shown, in some examples less decoders than channel assessors may be present. In an example, only a single decoder is provided. In an example, the decoder may receive a signal from the cleanest channel, as indicated by the plurality of channel assessors. The channel assessors 502-508 may be configured to have the same receive bandwidth as that observed by the downstream decoders 510-516. If the downstream decoders 510-516 implement additional filtering, there would be some differences between the absolute performance between a channel assessor and an associated channel decoder. If the primary goal of the channel assessment tool (CAT) algorithm is to find the best channels, the relative performance across channels may not be as sensitive to the minor receive bandwidth differences, which may be present if the decoders have additional filters not used by the channel assessors. To improve the accuracy of the channel assessors matching respective downstream decoder(s), another filter (e.g., aux. filter bank 416 of FIG. 4) could be added at the input of the channel assessor that is representative of any downstream filtering. The channel assessment results 518 may be used by the CAT manager 308, and may be stored in the CAT database 318. The channel assessment results 518 may be used to select appropriate channel plans for a single device or some or all of a network of devices. The channel assessment results 518 may be used to determine network efficiency, the need for additional or different RF spectrum, the need for additional or different RF equipment, etc.

Figure 6:
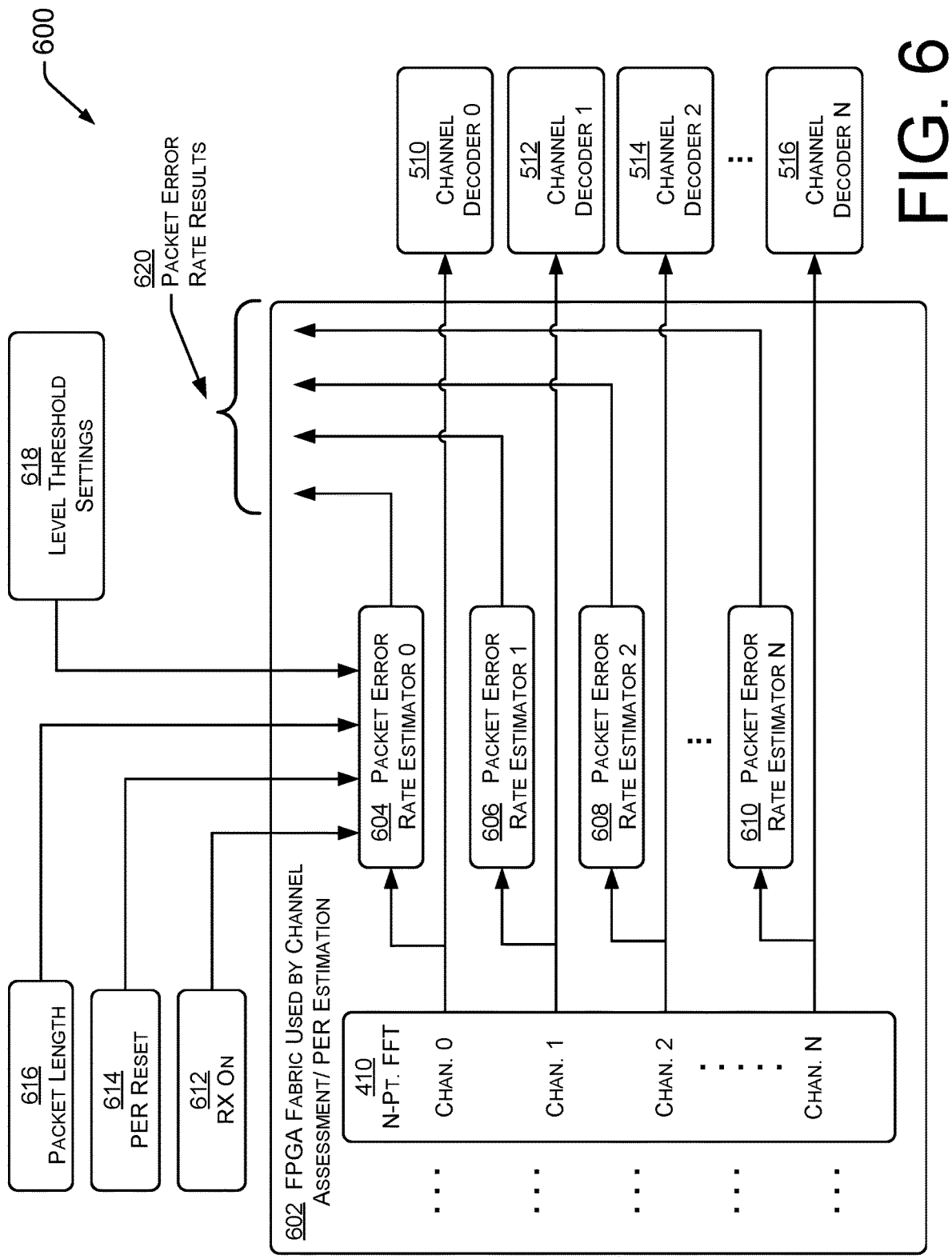
FIG. 6 is a block diagram showing example packet error estimators and modulation decoders.

FIG. 6 shows example portions 600 of a radio used for channel assessment using PER estimation techniques. Accordingly, FIG. 6 shows estimation techniques which contrast with the examples of FIG. 5, where channel assessment could be performed in a generic manner, utilizing any technology and any techniques. The packet error rate estimation results 620 are obtained from a plurality of packet error rate estimators 604-610. FIG. 6 shows a plurality of decoders 510-516, which receive the same or similar signal as associated PER estimators 604-610. While the same number of estimators and decoders are shown in the example of FIG. 6, in other examples less decoders than PER estimators may be present. In an example, only a single decoder may be provided and/or utilized. The decoder may receive a signal from the cleanest channel, as indicated by the plurality of PER estimators 604-610. Packet error rate estimation advantageously does not require packet decoding, which reduces the required overhead of FPGA fabric and/or other hardware and/or software.

In an example, a sample rate of the I/Q samples is an integer multiple of the bit rate. Each PER estimator 604-610 is only active when RX On signal 612 is asserted. This signal is derived from the RX/TX switch control that is connected directly to the FPGA. This control may originate from digital signal processor (DSP) Core 1 of the system on a chip. The PER reset 614, packet length 616 (in bits), level threshold setting 618, and channel assessment results line(s) 620 may all be managed by the CAT manager 226 found in the ARM processor 214 (in FIG. 2). The PER reset line 614 will set the "good packet" (received without error) counters to 0 along with resetting any existing bit-energy registers. The packet length 616 defines the size of the packet in which the PER is being estimated. The level setting threshold(s) 618 define the levels in which the PER is being estimated. The level setting threshold 618 represents the input referred power level of the radio and is the binary value after taking into consideration any upstream gains/losses. Anytime the automatic gain control (AGC) changes the upstream attenuator(s), the level threshold settings 618 may be updated.

Whenever a reset occurs (e.g., if PER reset 614 is asserted), the PER estimator starts over and sets all relevant counters to zero. A first step may be to calculate the total energy over a bit detection period. Based on the implementation of the downstream decoder, some of the samples on the bit boundaries may be discarded, therefore the bit detection period should only include the amount of time used when interrogating a bit in the downstream decoder.

In the example of FIG. 6, the PER estimators 604-610 are instantiated in FPGA fabric 602. The example shows packet error rate (PER) estimators 604-610 and decoders 510-516. In the example shown, the PER estimators receive input from RX ON 612, PER reset 614, packet length 616 and level threshold settings 618. The terms "channel assessor" (seen in FIG. 5) and "packet error rate (PER) estimator" (seen in FIG. 6) are used to refer to channel assessment generally, and a more specific means of assessment, i.e., PER estimation, respectively. Thus, a PER estimator is a particular tool for use in channel assessment. The output 620 of the PER estimation is used, for example, by the CAT manager 226 (shown in FIG. 2).

The PER Estimator should have the same receive bandwidth as observed by the downstream decoders. If the downstream decoders implement additional filtering, there would be some differences between the absolute performance between the PER estimator and PER of an actual decoder. If the primary goal of the CAT algorithm is to find the best channels, the relative performance across channels may not be as sensitive to the minor receive bandwidth differences. To improve the accuracy of the PER estimator matching the downstream decoder, another filter could be added at the input of the PER estimator that is representative of any downstream filtering. Another approach would be to adjust the level threshold setting 618 to compensate for the ENBW improvement due to the downstream filtering. However, that approach may have more uncertainty than techniques that utilize an actual filter match.

In further example, because a plurality of PER estimators 604-610 are operating simultaneously, an estimated packet error rate on the first channel, the second channel, and/or a plurality of other channels, may be performed simultaneously.

Example Packet Error Rate Estimation

Figure 7:
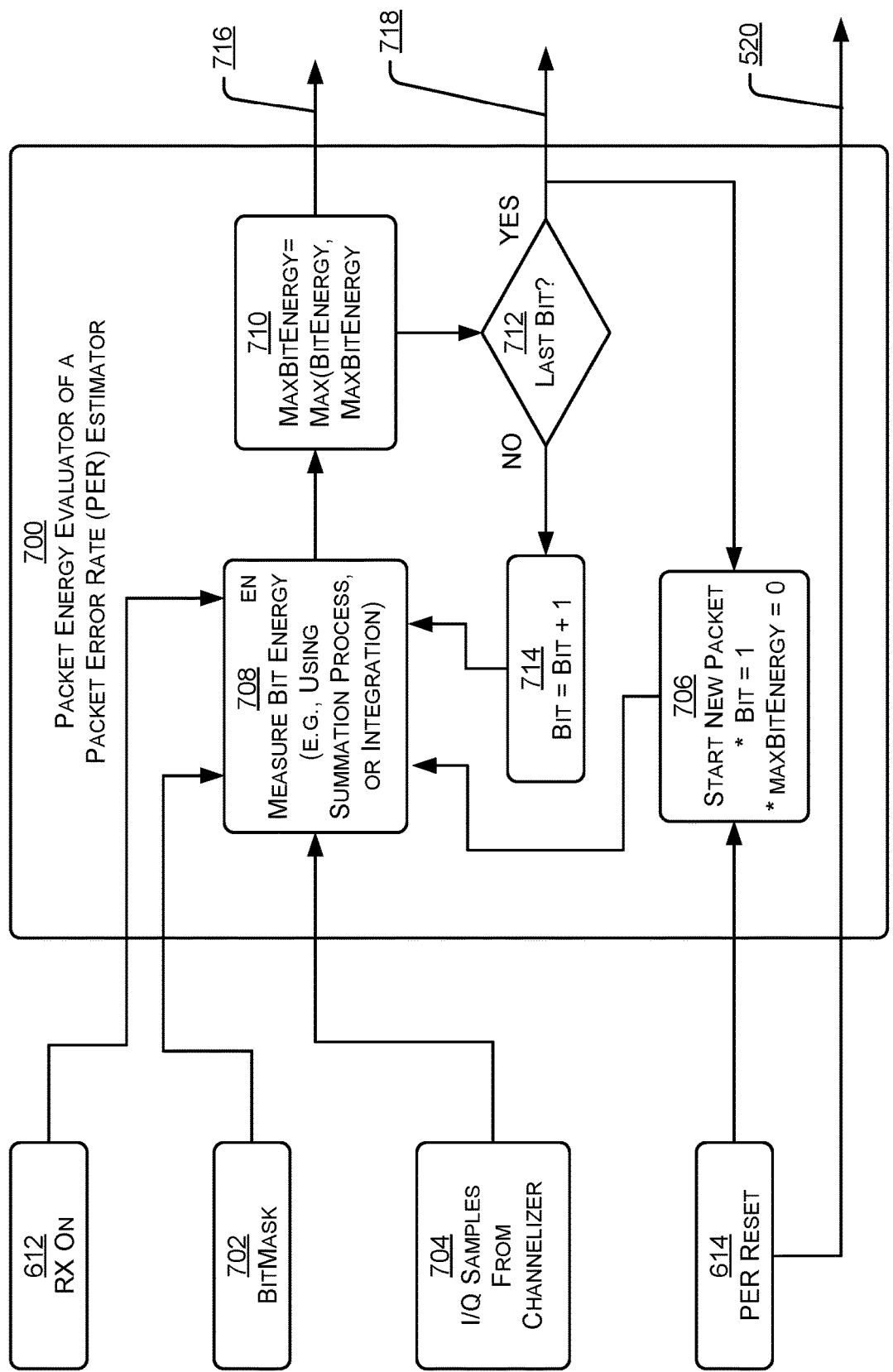
FIG. 7 is a block diagram showing an example configuration for packet energy evaluation, such as for use in packet error rate estimation.
Figure 8:
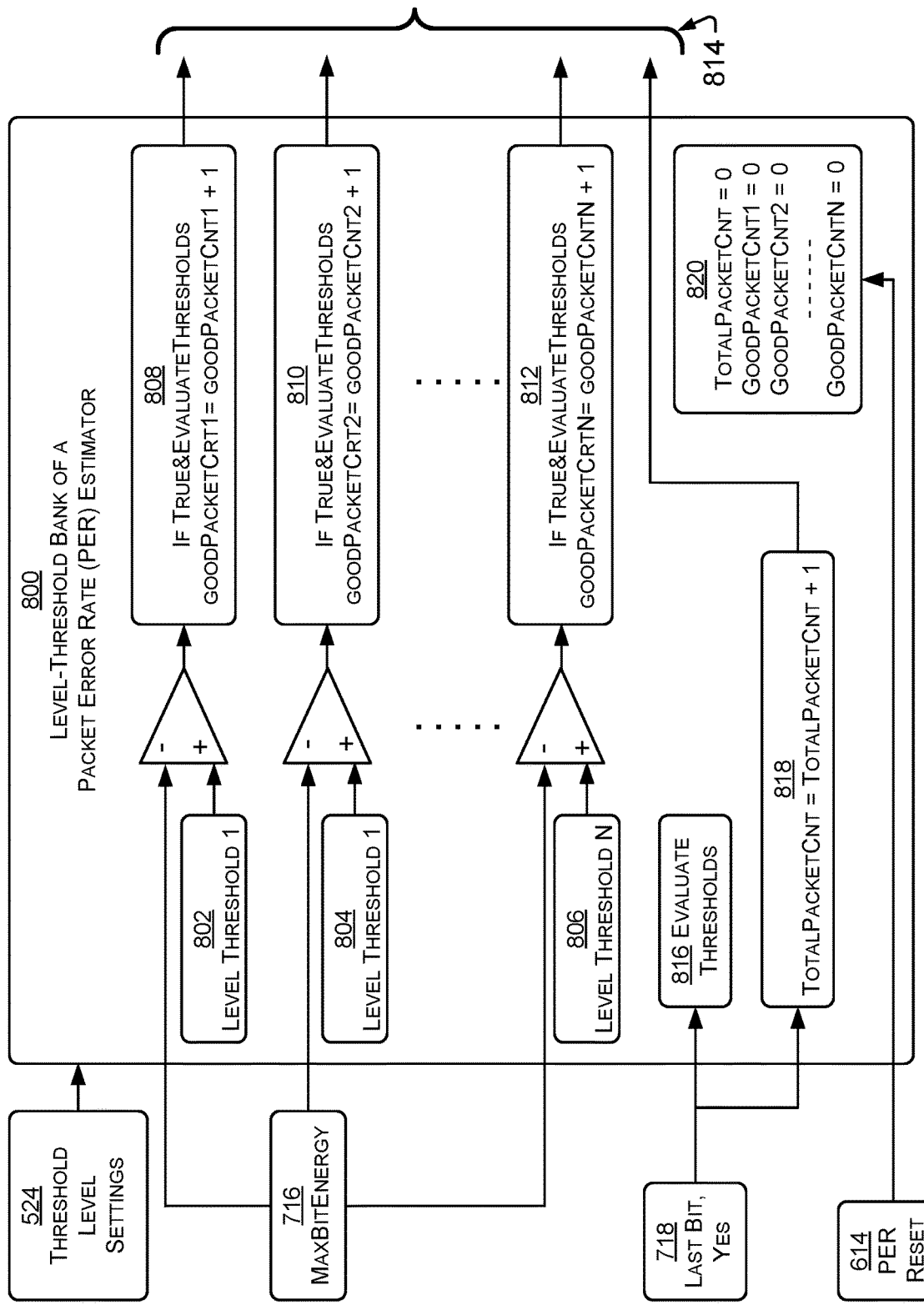
FIG. 8 is a block diagram showing an example configuration for energy threshold level bank, such as for use in packet error rate estimation.

FIGS. 7 and 8 show example operation of a packet error rate (PER) estimator. In an example, the techniques for estimating the packet error rate (PER) performance may utilize an FSK, MSK, or OOK decoder in the presence of an arbitrary interfering signal. In the example, the techniques for PER estimation require no decoder, reference packets, or even an actual demodulator. In example applications, the PER estimation has been shown to be accurate for all types of time domain interferers, including those having arbitrary bandwidths. While not comprehensive, the examples of spectrum and/or interferers that work with the example techniques include clean spectrum with no interference; random noise-like interference; unpredictable and/or bursting (e.g., "on/off" signals; combination of an infinite number of other signals present in the air-waves that is prevalent in shared spectrum (e.g. unlicensed bands); signals with varying power levels over time; signals with varying frequency error over time; and/or any modulation mode or combination of modulation modes.

In a number of examples, PER estimation can be conducted for packets of any practical packet length. PER estimation can be conducted for packets of arbitrary data rates. PER estimation can be performed for packets of arbitrary FM deviation rates (for FSK/MSK decoders) or AM depths (for OOK Decoders). PER estimation can be conducted at single power level or simultaneously at multiple power levels which could be spaced over an extremely large power range >80 dB. This capability enables the generation of a PER vs. received power level curve. The simultaneous estimation at all power levels is accomplished without requiring any hardware changes in the receiver. PER estimation can be conducted in real-time, and conducted continuously, so no post-processing of the incoming time domain sample stream is required. This perpetual real-time capability eliminates the possibility of ever missing short random burst-like interference, which might cause overestimation of the quality of the RF spectrum.

Additionally, there are a number of advantages of the herein described PER estimator vs. performing PER estimation and/or calculations according to techniques that use an actual and/or real decoder. In a first advantage, the PER estimator is cheaper (i.e., less expensive to implement) and may require less fabric in an FPGA or a less complex ASIC. In a second advantage, the techniques described herein require less power. This advantage follows in part from the simpler and more reliable design of the PER estimator described herein. Since the PER estimator can simultaneously evaluate multiple power levels, a PER vs. power curves (e.g., graph, table, equations, etc.) can be determined substantially faster than using traditional methods. The efficient design fits into smaller devices (FPGA) utilizing less fabric and requiring fewer MIPs.

The PER estimator described herein has a number of uses. Examples of the uses include channel assessment, i.e., looking for "cleaner," "quieter," and/or better locations in an RF spectrum, channels within a channel plan, channel plans from among available channel plans, etc. In another example use, the PER estimator may determine or perform link margin analysis and/or read reliability performance. In yet another use, the PER estimator may be used for pre-deployment field assessment for determining suitable radio installment location(s). That is, when building a networked radio system, the PER estimator may be used to find a preferred location to put a radio that communicates with one or mode networked endpoints and/or nodes. In a further use, the PER estimator may be used in post-deployment field assessment for troubleshooting poor performing sites within an established network of radio-equipped devices.

FIG. 7 shows how energy is measured in bit-length periods of time over a packet-length period of time to find the bit-length period of time with the maximum energy as compared to other bit-length periods within the packet-length period of time. FIG. 8 shows how the maximum energy value (found in FIG. 7) is compared to a plurality of thresholds. Each threshold that is exceeded indicates that the RF spectrum is noisier than would be the case of the threshold was not exceeded, and that the PER is expected to be higher than a value associated with that threshold. Accordingly, by using appropriate threshold(s), graph(s), table(s), database(s), and/or other data structure(s) of information can be configured for each of one or more different frequencies, showing the packet error rates for one or more power levels.

FIG. 7 shows a packet energy evaluator 700 that may be part of a PER estimator (e.g., PER estimator 228 of FIG. 2). The evaluator 700 may be configured in the fabric of an FPGA, an ASIC or other device. In operation, the evaluator 700 evaluates energy levels of bit-length periods of time for use in the packet error rate (PER) estimation.

FIG. 7 shows several inputs provided to the packet energy evaluator 700. An RX On 518 is an indication that the radio is receiving and not transmitting. A packet error rate (PER) reset 520 can be used to reset the levels of measured and/or calculated energy to zero, such as at the start of energy measurement. A mask 702 can be used to focus calculation on a particular set of samples. The set of samples may represent the number of samples that is present in a bit period, which is consistent with the downstream decoders. An in-coming I/Q sample stream 704 is received from a channelizer (e.g., channelizer 410, seen in FIG. 4).

In an example, bit power or bit energy (e.g., power or energy over a bit-length period of time) is constantly monitored, regardless of the packet length. In an example, the packet length and/or bit length may be associated with a modulation scheme. The PER estimation process may define statistics associated with any particular packet length, which may be used to determine read reliability. Whether using a packet length period that is short or long, the statistics are for a specific packet length which is configurable and can be arbitrary.

At block 706, a packet error reset is received. The reset may indicate that a new bit-length maximum energy value is to be found over a period of time require to transmit a packet. This may occur when enough samples to represent a length of an entire packet have been assessed, and a new packet is to be analyzed. The packet length is set by packet length input 522 of FIG. 6.

At block 708, bit energy is measured. In an example, power or energy over a bit-length period of time is measured (i.e., the time to transmit a bit using the modulation scheme). Any desired technique may be used, such as techniques using summation, integration, convolution strategies and/or alternative methods and/or apparatus. The bit mask 702 may be used. Accordingly, processes may be used to find the maximum measured bit power or energy (e.g., energy in a period of time required to transmit a bit) over the predefined packet length (e.g., a period of time required to transmit a packet).

In an example, instead of having a bit counter and evaluating the maximum bit energy within structured bit boundaries, a convolution operation could be modified to run continuously over the number of samples found in the packet and to capture the maximum bit energy over a bit-length period of time at any location within the predefined packet-length period of time. This alternative method may simplify the FGPA implementation.

At block 710, the energy over a current bit-length period of time is compared to a previous maximum, and if greater, it becomes the maximum value. Accordingly, over the packet-length period of time the maximum bit-length energy value is obtained. At block 712, it is determined if the bit is the last bit-length period of time in the packet-length period of time (i.e., a period of time required to send a packet using the modulation scheme). If not, the bit value is incremented to a new bit-length period at block 714, and at block 708, the energy of that bit-length period of time is evaluated. Unlike a decoder based on a modulation scheme, the packet energy evaluator 700 does not synchronize to a packet header, and the last bit signal 712 does is not based on an actual end of an actual packet.

The output of the packet energy evaluator 700 may include the maximum energy value 716 found in a bit-length period, from among a plurality of bit-length periods of time taken over a packet-length period of time. While bit-length and packet-length periods of time may be utilized, energy values over other periods of time could be measured, and optionally compared to other measured values, and the result assigned to a maximum energy variable.

The output of the packet energy evaluator 700 may also include an indication of the last bit 718 and an indication of the PER reset 520.

FIG. 8 is a block diagram showing a level threshold bank 800 that may be part of a packet error estimator (PER) estimator (e.g., the PER estimator 228 of FIG. 2). The threshold bank 800 may be configured in the fabric of an FPGA, an ASIC or other device. In operation, the threshold bank 800 evaluates an in-coming maximum energy level against at least one threshold value. The relationship of the in-coming energy value and one or more thresholds may be used to estimate the packet error rate (PER) at different frequencies (channels) and for different transmission power levels. The relationship may be used to build and maintain a database that aids in the selection of channel(s) and/or channel plan(s) for use. The database may include PER versus transmission power level data and/or read reliability data. The threshold bank 800 may be part of one PER estimator.

FIG. 8 shows several inputs. The level threshold settings 524 are used to set the values for one or more thresholds. A plurality of thresholds, each of which may be associated with a particular estimated PER, helps to estimate the packet error rate. For example, if a max bit energy is found to be below a threshold, this indicates that background noise is below the threshold. If so, and the power or energy of an incoming signal was associated with the threshold level, then it is estimated that a packet would have been successfully received. Consequently, then one or more of the counters found in 808-812 would be incremented. PER is calculated based on the counted values after the observations of many packet length intervals. In an example, the actual PER calculation may be performed in the CAT manager found in the ARM (e.g., CAT manager 226 in ARM 214 of FIG. 2). At this point, the counters reflect the number of successful packets found at each threshold. Data record 820 (e.g., an element of a database that may be managed by the CAT manager) reflects information related to the total number of packets evaluated.

Referring to FIG. 8, the threshold level settings 524 are used to set the thresholds 802, 804, 806. The level-thresholds may be selected to better assess RF spectrum at calculated points. In an example, the threshold levels may be set so that the maximum bit energy exceeds some thresholds and not others. If so, then the power or energy level of a transmission that exceeds the maximum bit energy (which represents the noise floor of the RF environment) can be determined (e.g., to be between two thresholds). If the power or energy used in a transmission is higher than indicated by a threshold that was not exceeded by the maximum bit energy, then the transmission will therefore be received as a packet.

The maximum energy value (e.g., the maximum energy measured from among bit-length periods over a packet-length period) is seen at 716. This energy value is compared to one or more threshold values 802, 804, 806. The number of thresholds used can be from one to many, depending on the resolution desired and the processing power available.

After the comparisons, the output values are fixed at blocks 808, 810, 812. The output values 814 may be sent to a manager or program (e.g., to the CAT manager 226 in FIG. 2). Every threshold that is exceeded by the maximum bit energy value indicates noisier RF spectrum. In the example, every count in blocks 808-812 indicates a successful reception of a packet. For example, if CNT=123, then 123 packets, if transmitted at a power or energy above the associated threshold, would have been received. The more thresholds that are available, the better resolution can be obtained on the PER estimation. Better resolution indicates a transmission power or energy level that is sufficient to result in a correctly received packet and it allows for better distinction when comparing the PER results between different channels.

At block 718, the last bit is indicated. In an example, the number of bit-length energy measurements is equal to the number of bits in a packet, after which the process is repeated, to calculate a further maximum energy value. The last bit indicator 718 may be used to trigger a reevaluation of the threshold values or levels at 816 and consequently update the good packet counts. The last bit indicator 718 may also be used to increment the total packet count, which may be part of the output data 814.

A PER reset 520 may reset the data 820, which ultimately resets all of the counters and consequently starts a new PER estimation session.

In an example, the stream of I/Q samples are received from a channelizer. As shown in FIG. 6, samples 604 are streamed from the channelizer. The calculating of the power or energy may be based at least in part on selection of a highest calculation of power or energy made over bit-length durations of time during a period of packet-length duration. The selection of "bit-length" may be based on a particular modulation scheme. Bit energy may be determined over a period identified by the mask 702. Max bit energy is determined over the period indicated by the packet length 522. Once the period identified by the packet length 522 is completed, signal 718 will assert the last bit and the thresholds found by the level-threshold bank 800 are evaluated and the counters found in 808-812 and 820 are updated. This process continues until a PER reset 520 occurs which resets all of the counters and a new PER estimation session is started. In an example, the CAT manager in the ARM may read all of the counters prior to resetting the PER session. The results from these counters may be used to calculate the PER for each threshold.

As seen in FIG. 8, multiple thresholds may be implemented, which will provide PER at multiple transmission power or energy levels on each channel (e.g., a particular RF frequency). This is very useful when there is a large variation in interference energy from channel to channel. In one example, a threshold may be used (e.g., such as by transmitting using a power or energy level that is just over a level associated with the threshold) that results in a desired PER. If a threshold that results in the desired PER is not known, then the threshold values may be adjusted. By using multiple thresholds, one threshold will be more likely to provide a desired PER. Accordingly, the routine for adjusting the thresholds (e.g., threshold evaluation 816) will trigger less often or can potentially be eliminated.

After completing the analysis for the time period required to transmit a packet, the process repeats by analyzing an I/Q sample stream for the next incoming packet period. In some examples, all parts of the process are continuously performed, such as by multiple pipelines. The processes will continuously operate until reset at 520 by the CAT manager (e.g., CAT manager 226 of FIG. 2).

In an example, if there were only 1 bit-energy period in the packet that was above a threshold, 50% of the time this bit would be detected correctly in the decoder. As more maximum bit energy values are above the threshold, the probability that the packet would fail increases. An extended example of the algorithm takes this probability into consideration along with tracking the number of failed bits. This algorithm assumes that forward-error-correction (FEC) is not being used and a single erroneous bit will cause a failed packet. If FEC is enabled, this algorithm adjusts the estimated number of bit errors based on the ability of FEC to correct errors.

Anytime the RX On signal (indicating transmission by the radio) becomes inactive, the packet evaluation is halted. Once the RX On becomes active, the algorithm needs to implement a brief "wait" period before resuming packet evaluation. This wait period may be selected to match the size of the preceding pipeline which will contain corrupted I/Q samples whenever the RX/TX switch set to TX mode.

To complete the PER calculation, an additional counter may count the total number of packets analyzed. Even though there is a good packet count for each channel, there only needs to be one total packet count when more than one channel is being assessed. Therefore, all channels are synchronized when analyzing the streaming I/Q samples. The CAT manager is responsible for the final PER calculation whenever it queries the packet counters found in 808-812 and 820.

The size of the counters may be scaled to match the longest desired PER estimator session for the shortest length packet. Since a counter exists for every level threshold on every channel along with a total packet counter, the size of the counter may be optimized to minimize the amount of FPGA fabric. For example, when using non-coherent binary frequency shift keying (NBFSK) with a data rate of 10 kbps and a packet length equal to 250 bytes, a 24-bit counter would typically be sufficient for PER estimator sessions that are several weeks long.

Figure 9:
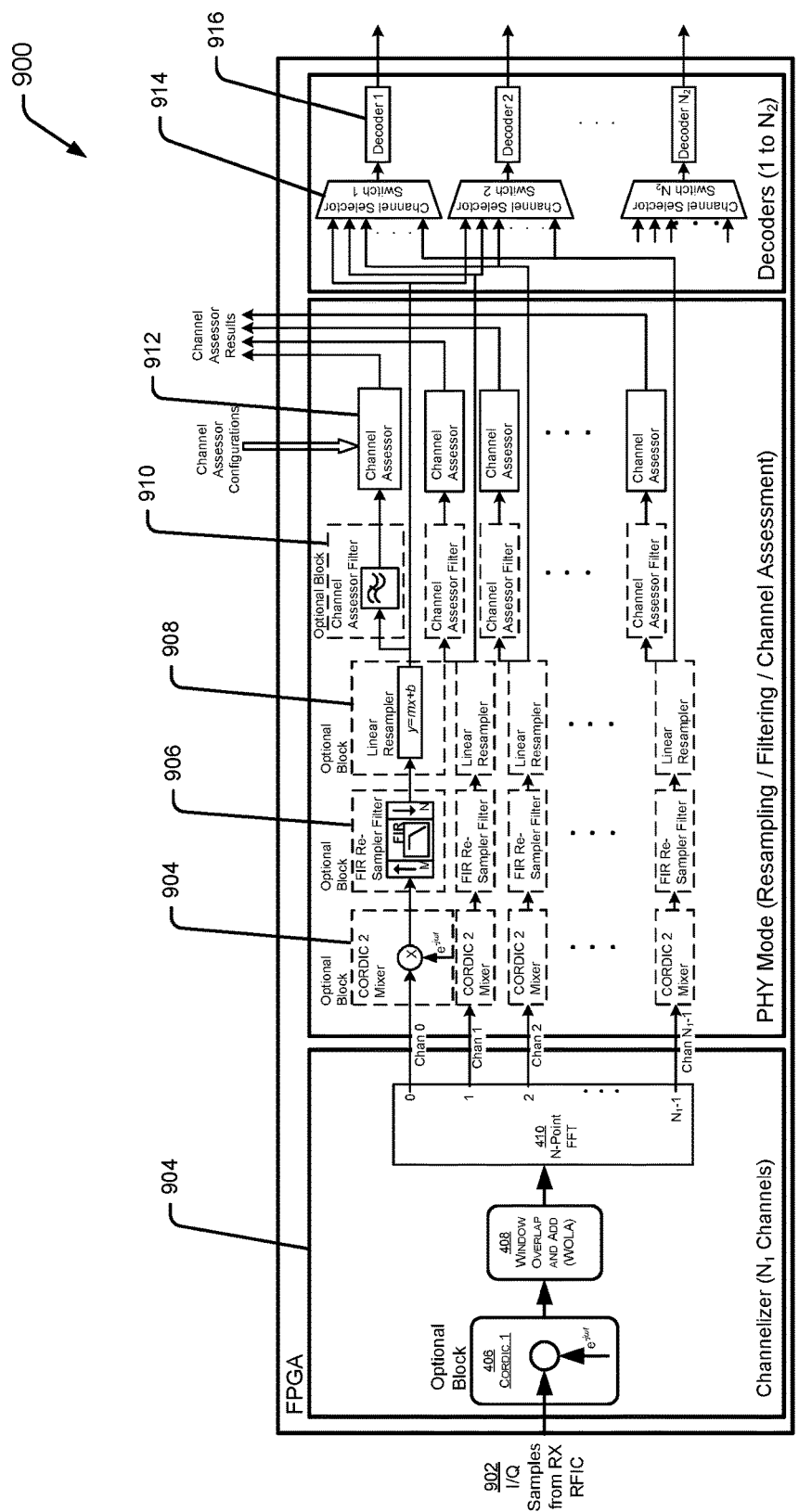
FIG. 9 is a block diagram showing an example configuration for a field programmable gate array (FPGA), application specific integrated circuit (ASIC) or other hardware device for use in channel assessment and modulation decoder selection (e.g., based on results of the channel assessment).

FIG. 9 shows an example configuration for a field programmable gate array (FPGA), application specific integrated circuit (ASIC) or other hardware device 900 for use in channel assessment and modulation decoder selection (e.g., based on results of the channel assessment). In the example, a broadband digitizer can be connected to a plurality of channelizers, a plurality of channel assessors. In operation, the FPGA 900 is able to simultaneously conduct real-time channel assessment on multiple channels (e.g., based on PER estimation), while performing normal RF network activity without synchronization between these two processes.

Additionally, in some examples, a radio using the FPGA 900 is able to continuous evaluate an entire radio spectrum in a manner that reduces and/or eliminates missed (possibly random) bursts of interference signals. Such signals, if missed, may have resulted in unexpectedly high PER on associated channels. In some examples, the FPGA 900 implements exceptional channel-to-channel blocking, thereby eliminating adjacent channel signals from leaking across channel boundaries and compromising the accuracy of channel assessment. In some examples, the FPGA 900 supports operation for both half- and full-duplex radios.

A radio using the FPGA 900 is capable of assessing multiple channels with a single channel receiver or a multi-channel receiver. In an example, the radio may utilize a single channel plan and single PHY modes. In another example, the radio may utilize channel assessment on multiple channels. In another example, the radio may utilize a single decoder or a plurality of decoders to conduct normal network activity (e.g., transmission and reception of packets).

The FPGA 900 receives a stream of I/Q samples 902 at a channelizer block 904. The channelizer may include a complex mixer 406 (e.g., CORDIC 1) to align the received radio band needs to fast Fourier transform (FFT) bins. The output of the complex mixer 406 may be sent to a window overlap and add (WOLA) function 408, which may serve two primary purposes, including windowing resampling the incoming data. The output of the channelizer block includes streams of I/Q samples associated with each of a plurality of channels.

The FPGA 900 includes a physical mode (PHY mode) for resampling, filtering and channel assessment. A plurality of CORDIC 2 mixers 904, finite impulse response (FIR) resampling filters 906, linear resampling filters 908, and channel assessor filters 910 are similar to those blocks seen in FIG. 4. Channel assessors 912 each receive I/Q samples from an associated channel, and provide channel assessment results. The channel assessors may be configured, such as with threshold levels, etc. Each channel is output (e.g., from the linear resampling blocks to a channel selector switch 914. Using the switch, any channel may be sent to any decoder. Such switching allows decoders to be associated with channels that have less noise. Accordingly, if a decoded channel becomes noisier, and a non-decoded channel is quieter, then the switch 914 can be used to route the cleaner channel to the appropriate decoder, and transmission may be moved from the noisy channel to the quiet channel. The decoder bank 916 may include one or more decoders, each associated with a modulation scheme.

Figure 10:
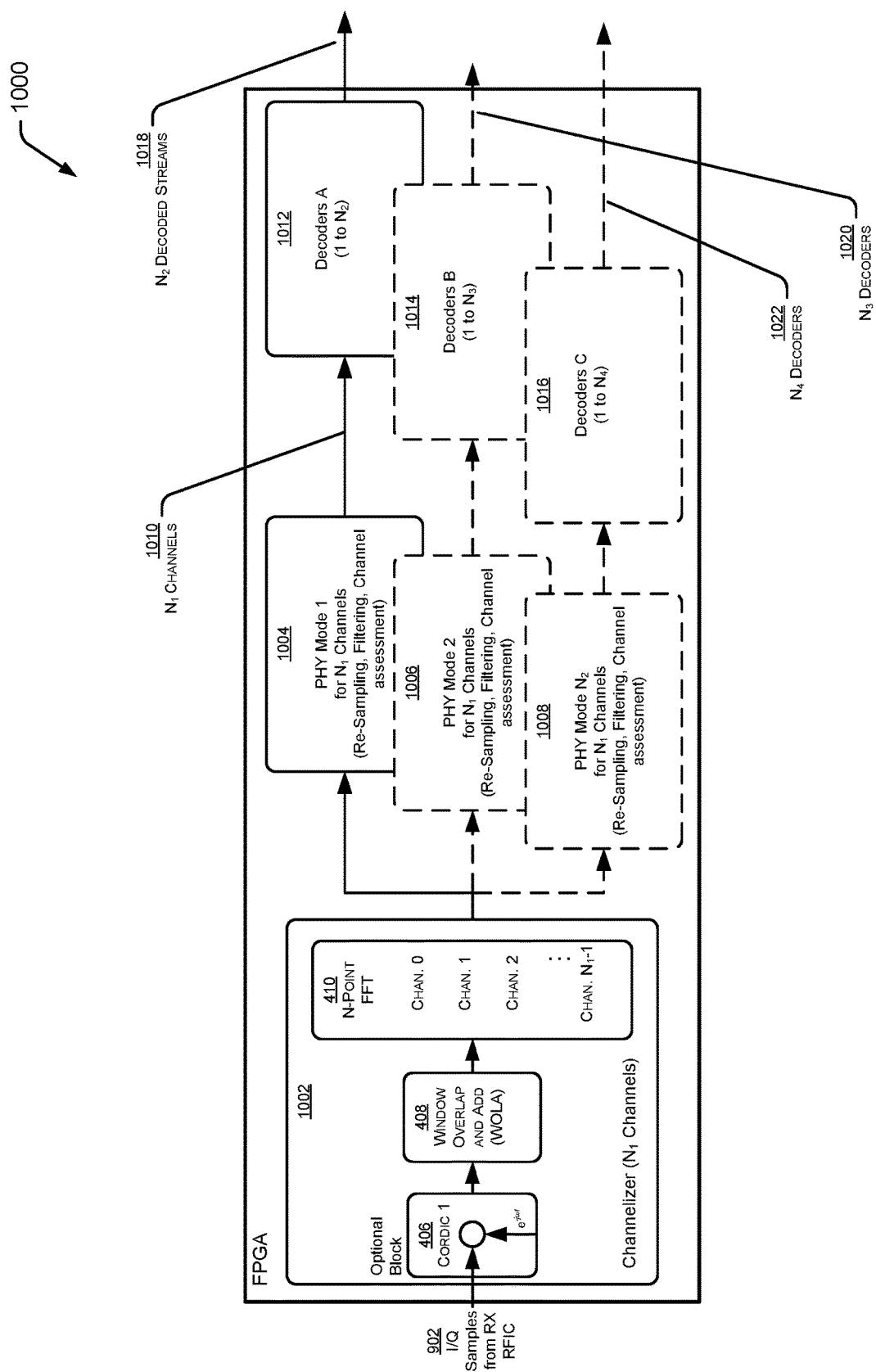
FIG. 10 is a block diagram showing an example FPGA, ASIC or other hardware device configured to simultaneously assess multiple physical layer modulation modes with differing bandwidths, data rates and sample rates, and which share a common channel plan.

FIG. 10 is a block diagram showing an example FPGA, ASIC or other hardware device 1000 configured to simultaneously assess multiple physical layer modulation modes with differing bandwidths, data rates and sample rates, and which share a common channel plan (e.g., a single channelizer block 1002). In an example radio utilizing a version of the hardware device 1000, the radio may utilize a single channel plan and channelizer 1002 and a single physical layer mode 1004. In another example radio, the radio may simultaneously assess multiple physical layer modes with differing bandwidths, data rates, and samples rates, while sharing a common channel plan. Thus, the radio may utilize a single channelizer 1002 and multiple PHY modes 1004, 1006, 1008. In a further example, the radio may perform channel assessment on multiple channels and multiple PHY modes. And in a still further example, a radio may include a single decoder 1012 or plurality of decoders 1012, 1014, 1016 for each of one or more PHY mode(s) 1004, 1006, 1008.

Figure 11:
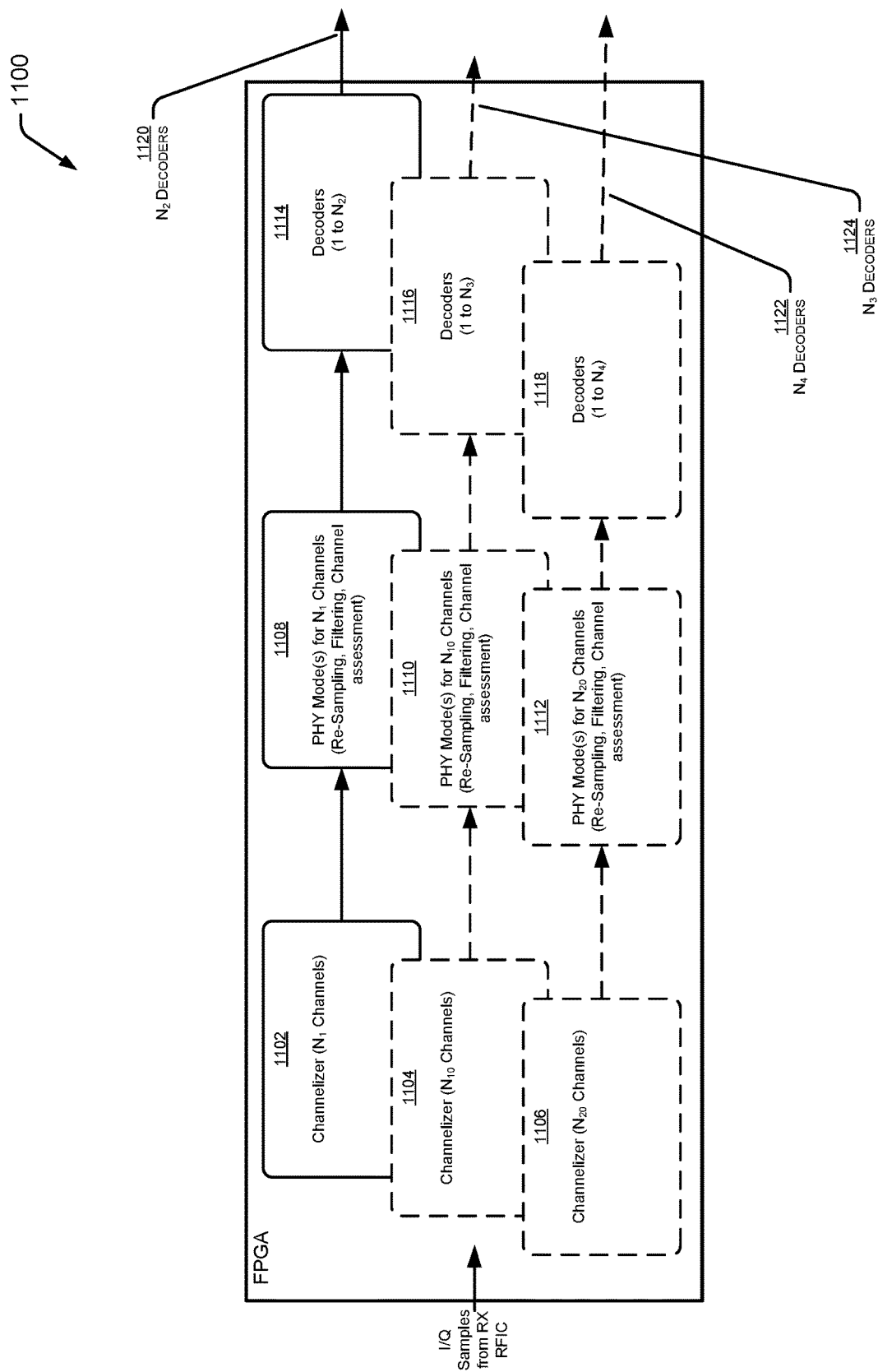
FIG. 11 is a block diagram showing an example FPGA, ASIC or other hardware device configured to simultaneously assess multiple physical layer modulation modes with differing bandwidths, data rates and sample rates, and which utilize dissimilar channel plans.

FIG. 11 shows an example FPGA, ASIC or other hardware device 1100 configured to simultaneously assess multiple physical layer modulation modes with differing bandwidths and data rates that have dissimilar channel plans. In a first example, radios may have multiple channel plans and multiple PHY modes. In a second example, radios may perform channel assessment on multiple channels for each channel plan and multiple PHY modes for each channel plan. In a second example, radios may utilize a single decoder or a plurality of decoders for each PHY mode on each channel plan.

Accordingly, an example radio may utilize one or more of the channelizers 1102, 1104, 1006, one or more of the PHY modes 1108, 1110, 1112, and one or more of the decoders 1114, 1116, 1118. The input of the radio may include a stream of I/Q samples, and the output may include data 1120, 1122, 1124 from one or more decoders.

Example Methods and Operations

FIGS. 12-16 show example methods and operation of a radio having features for channel assessment and packet error rate estimation. The methods and operations may be performed and/or directed by any desired processor, memory devices, integrated circuit, field programmable gate arrays, application specific integrated circuits, logic devices, programming, etc.

While some operations are shown in a linear manner for purposes of illustration and discussion, in many cases operations may be carried out in parallel. Referring to FIG. 2, operations may be performed in parallel in different locations within the FPGA 222, and other operations may also be carried out (while operations are performed on the FPGA) on the system on a chip 234. Accordingly, locating particular functions in different blocks within a flowchart does not indicate that the functions are performed at different times. Instead, separate blocks are utilized to allow emphasis and/or discussion of the associated functions, techniques, etc.

In some examples of the techniques discussed herein, the methods of operation may be performed by one or more application specific integrated circuits (ASIC) or may be performed by a general-purpose processor utilizing software defined in computer readable media. In the examples and techniques discussed herein, the memory may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

While functional blocks and device are shown to provide an operable example, such blocks and devices and their described functionality can be shared, mixed, or redistributed among other blocks and other devices in other examples.

As defined herein, computer-readable media does not include transitory media, such as modulated data signals and carrier waves, and/or signals.

Figure 12:
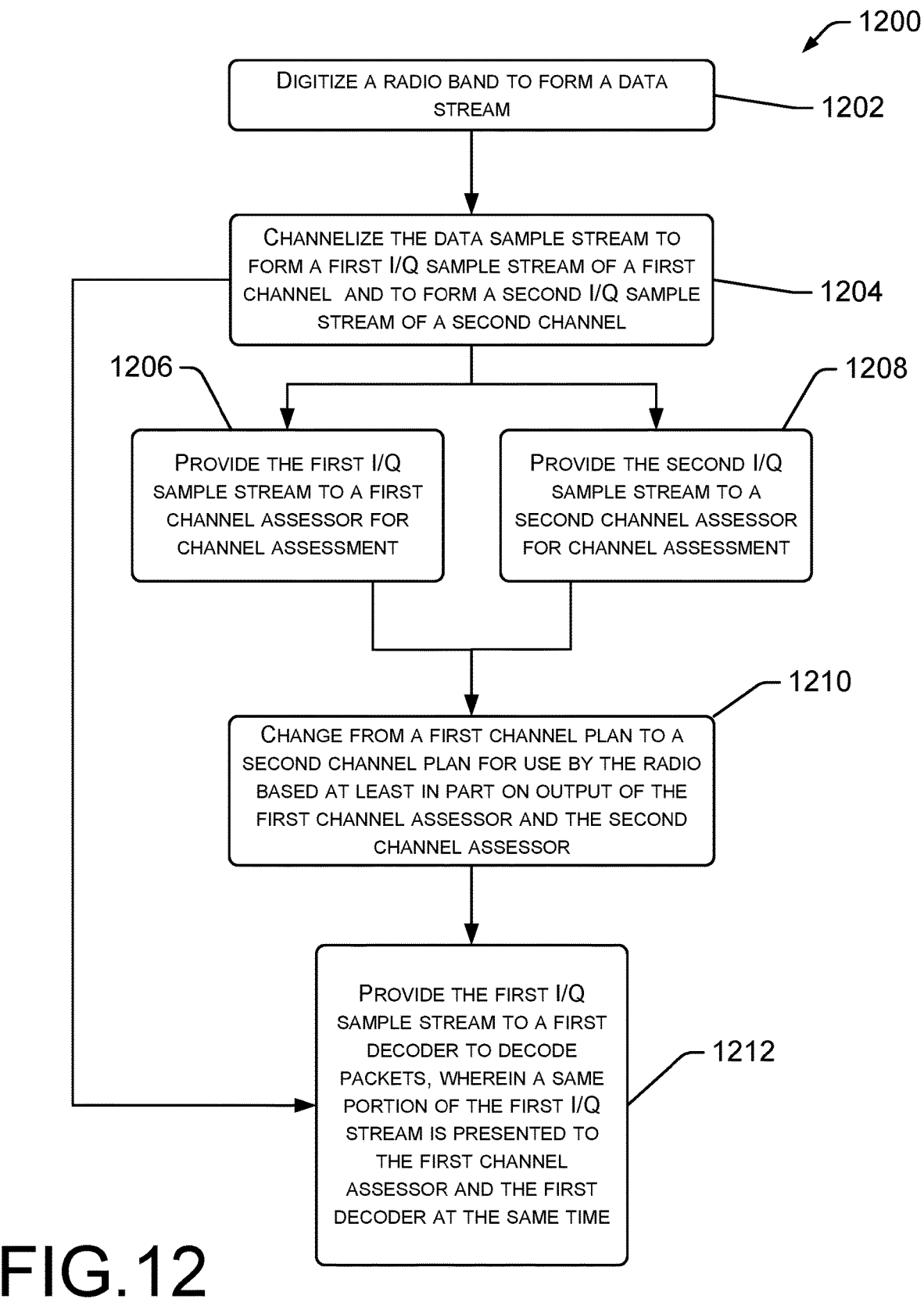
FIG. 12 is a flow diagram showing an example method by which a radio may digitize a radio band, channelize the digitized band into at least two channels, evaluate I/Q sample streams of at least two channel assessors in parallel, and provide the same I/Q sample streams to at least two decoders.

FIG. 12 shows an example method 1200 by which a radio may digitize a radio band, channelize the digitized band into at least two channels, evaluate I/Q sample streams of at least two channel assessors in parallel, and provide the same I/Q sample streams to at least one decoders, and select a preferred channel for use. In an example, if two channel assessors and one channel decoder are used, the decoder may receive an I/Q sample stream from the preferred of the two channels associated with the two channel assessors. The two channel assessors operate (in one example, assess PER in a respective channel) without actually decoding any packets from the two respective I/Q sample streams. Accordingly, two or more channel assessors may be used to assess two or more channels, while fewer channels are actually decoded.

At block 1202, a radio band is digitized to form a data stream. In an example, digitizing the radio band may be performed by digitizing the radio band in the time domain, wherein the radio band comprises sufficient RF spectrum to define at least two channels according to at least one modulation scheme.

At block 1204, the data stream is channelized to form a first in-phase in-quadrature (I/Q) sample stream of a first channel and to form a second I/Q sample stream of a second channel. In an example of parallel processing, the output of block 1204 may be sent to both blocks 1206 and 1210.

Regarding blocks 1202 and 1204 in the context of the example of FIG. 2, the transceiver 118 may be configured to receive the targeted radio band and digitize it into an I/Q sample stream. The transceiver may include mixers, analog filters, I/Q ADCs and several decimating filter stages, which may assist in creating the I/Q sample stream.

Regarding blocks 1202, 1204 in the context of the example of FIG. 4, the channelizer block receives the I/Q samples from the receiver 216 (of FIG. 2). The channelizer may include an optional front-end complex mixer 406, window overlap and add (WOLA) block 408, fast Fourier transformation (FFT) block 412, an optional second complex mixer bank 412, an optional re-sampler bank 414, and an optional auxiliary filter bank 416.

At block 1206, the first I/Q sample stream is provided to a first channel assessor for channel assessment. Assessment may determine the fitness of a channel for use in RF communications, and may determine a required signal strength to obtain a desired packet error rate. In the example of FIG. 5, the channel assessors 502-508 receive channelized input, such as from the fast Fourier transformation (FFT) block 410.

Similarly, at block 1208, the second I/Q sample stream is provided to a second channel assessor for assessment.

At block 1210, a first channel plan may (if indicated) be replaced by a second channel plan for use by the radio. In an example, the change is made based at least in part on output of the first channel assessor (block 1206) and the second channel assessor (block 1208). If one channel is quieter, it may be used in place of the noisier channel. If a plurality of channels is assessed, then one subset of the plurality of channels that was being decoded may be replaced by a second subset of the plurality of channels to be decoded. The network will therefore be operating on a "cleaner" or "quieter" set of channels.

Referring to the example of FIG. 2, the channel plan may be selected by the CAT manager 226, in the ARM processor 214. In the example of FIG. 3, the CAT manager 308 is configured in software stored in memory 306 and executed by processor 304. In another example, the channel plan may be managed by software, hardware, FPGA, ASIC, etc., as indicted by a particular design. In some examples of the change in channel plan(s), one or more decoders may be reconfigured to received I/Q sample streams from different channels or locations on the RF spectrum.

At block 1212, the first I/Q sample stream is sent to, and/or provided to, a decoder to decode packets. In the example of FIG. 5, a same portion of the first UQ sample stream is presented to the first channel assessor 502 and the first decoder 510 at the same time. In the example, channel-assessing and channel-decoding are performed simultaneously, and decoding is not required for channel assessing. In the example, the signal is bifurcated at 526. The bifurcation 526 (e.g., a signal-spilt) allows the same signal to be presented to the channel assessor 502 and the channel decoder 510 at the same time. Thus, in an example, the first UQ sample stream is bifurcated and provided to the first channel assessor and the first decoder; and the second I/Q stream is bifurcated and provided to the second channel assessor and the second decoder. In a further example, more channel assessors may be in operation than decoders. Thus, the system assesses channels that are being used, and other channels for possible future use. However, power and resources are saved by not decoding the channels that are not currently being used, but that are being assessed for quality. Accordingly, the first and second channel assessors may be operated while output of only one I/Q sample stream is decoded and/or used by the radio.

Block 1212 receives input of an I/Q sample stream from the channelizing process of block 1204. Block 1210 determines which sample stream should actually be decoded.

Blocks 1206, 1208 and 1212 may be performed simultaneously, i.e., in parallel. Because channel assessment is performed without the need to decode the channel, and the decoding may be performed without the need for assessment, the blocks 1206, 1208 and 1212 can be performed by parallel calculations.

While not shown in FIG. 12, in some instances the second I/Q sample stream may also be decoded. However, by assessing more channels than are decoded, the decoding process can be moved to the most desirable channel.

Figure 13:
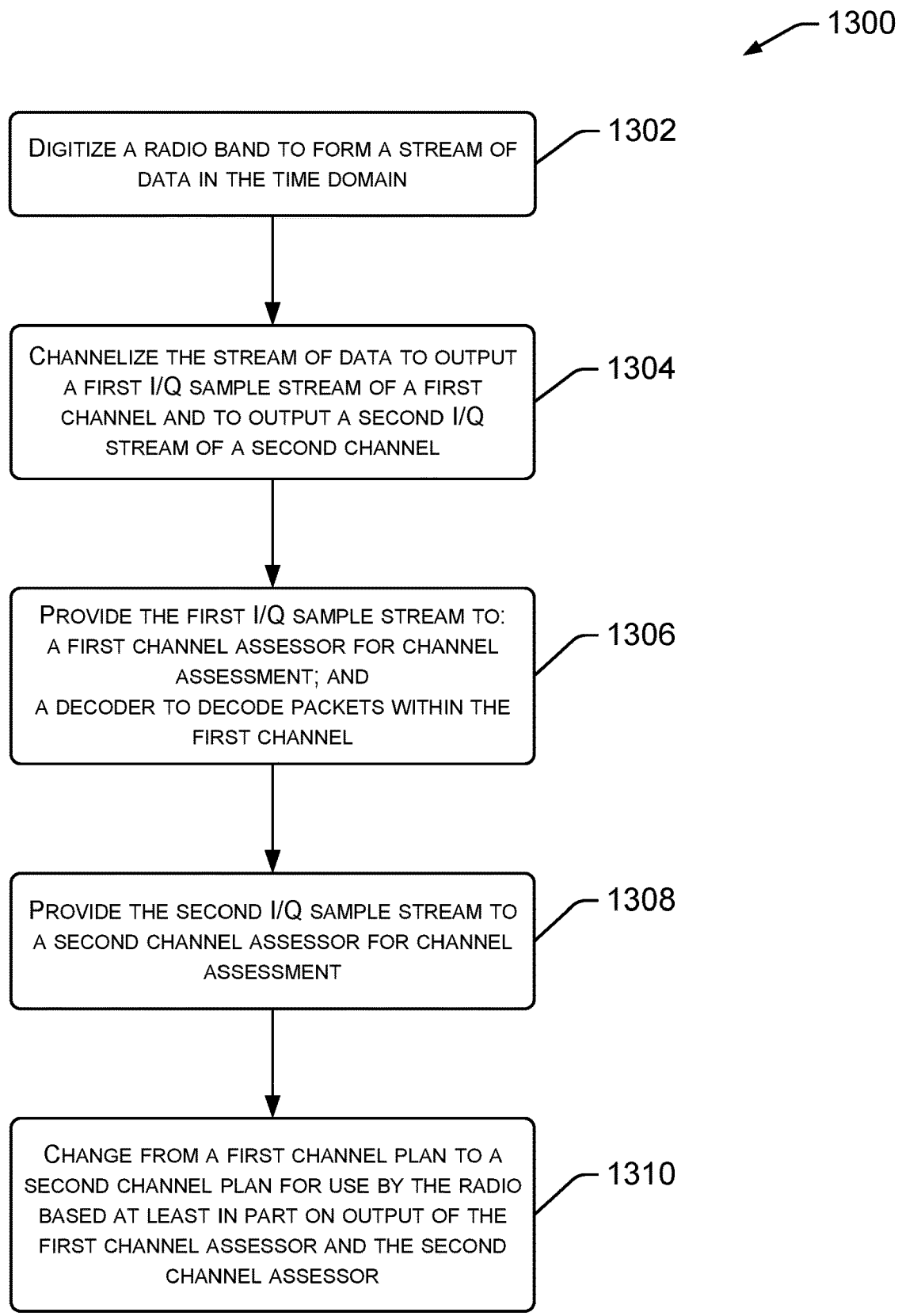
FIG. 13 is a flow diagram showing an example method by which a radio may digitize a radio band, channelize the digitized band into at least two channels, evaluate I/Q sample streams in at least two channel assessors in parallel, and provide the I/Q sample stream, which is determined to have the best/quietest channel to a decoder.

FIG. 13 shows an example method 1300 by which a radio may digitize a radio band, channelize the digitized band into at least two channels, evaluate I/Q sample streams of the at least two channels in at least two channel assessors in operations that are performed in parallel, and provide one I/Q sample stream to a decoder. If the channel assessors indicate that the channel provided to the decoder is not as quiet as another channel, the I/Q sample stream provided to the decoder can be changed to the quieter channel.

In an example based on an extension of the method 1300, a plurality of channels is assessed by a plurality of channel assessors, and a subset of those channels are decoded by decoders. By adjusting channel plans as needed, based on the output of the channel assessors, the decoders are associated with preferred channels.

At block 1302, a radio band is digitized to form a stream of data in the time domain. In the example of FIG. 4, the radio band may be digitized by operation of the CORDIC 406 and the WOLA 408.

At block 1304, the stream of data is channelized to output a first I/Q stream of a first channel and to output a second I/Q stream of a second channel. In the example of FIG. 4, the radio band may be channelized by operation of the fast Fourier device 410.

At block 1306, the first I/Q stream is provided to a first channel assessor for channel assessment, and also to a first decoder to decode packets within the first channel. In the example of FIG. 5 a channel assessor 502 and a channel decoder 510 receive channel 0 from the FFT device 410.

At block 1308, the second I/Q stream is provided to a second channel assessor for channel assessment.

At block 1310, a first channel or channel plan is changed to, or replaced by, a second channel or channel plan for use by the radio based at least in part on output of the first channel assessor and the second channel assessor. In the example of FIG. 9, the switch 914 is configured to change the channel(s) sent to any decoder.

Figure 14:
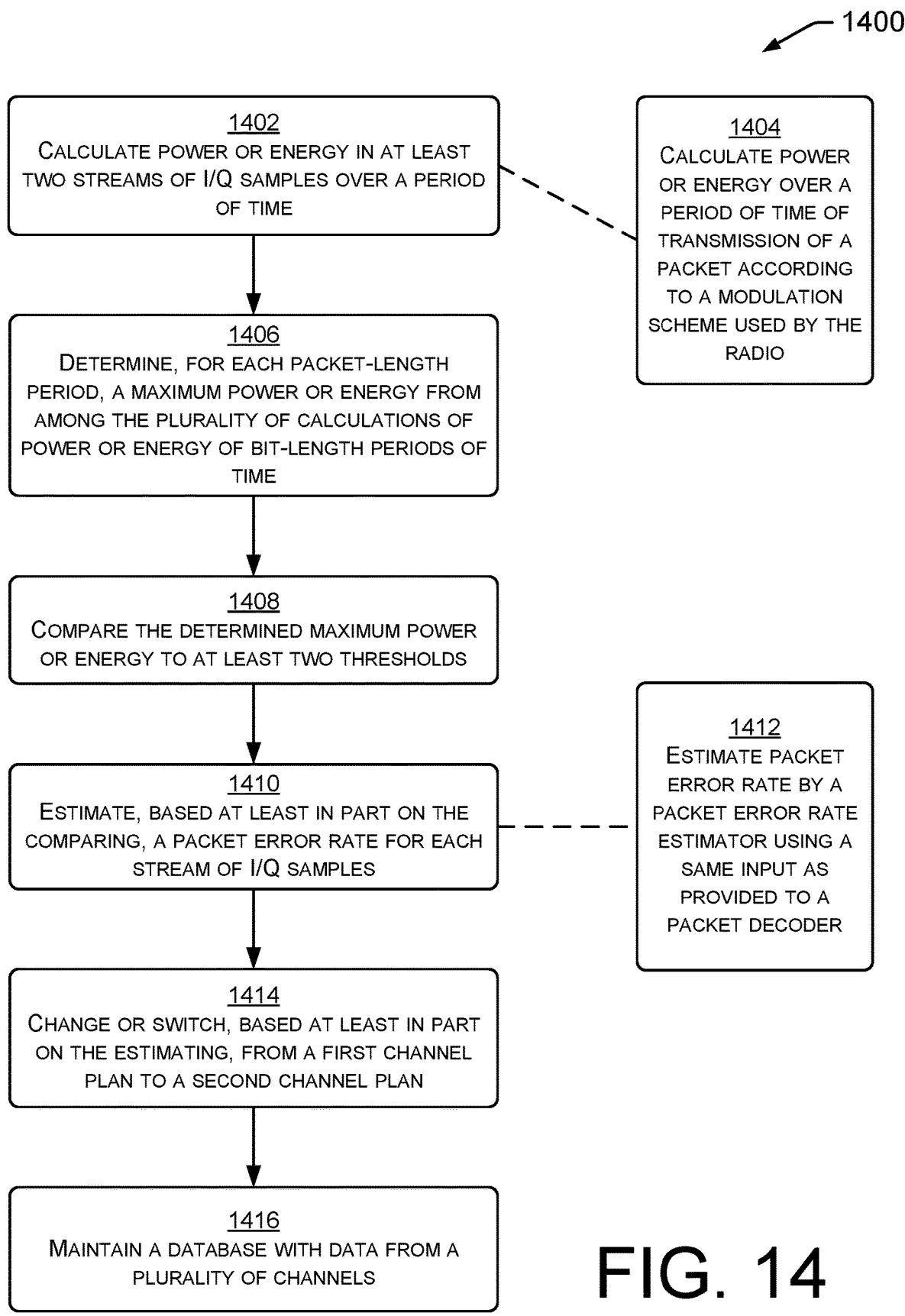
FIG. 14 is a flow diagram showing an example method by which a radio may estimate packet error rate for each of a plurality of channels without actually decoding the packets.

FIG. 14 shows an example method 1400 by which a radio may estimate packet error rate (PER) for each of a plurality of channels, without actually decoding packets on each channel. That is, while packet decoding is performed on one or more channels that are being actively used, PER for one or more other channels may be estimated, without decoding packets. If such a channel is found to be quieter than a currently used channel, the decoder may be switched to receive and decode the quieter channel instead of the currently-used noisier channel. In an example, a variable representing a maximum bit energy (e.g., maxBitEnergy, the maximum power or energy found over a bit-length period of time) within the packet length period of time, is determined. That value is compared to one or more thresholds. The comparisons form a mechanism to determine if a packet would be successfully received, without actually decoding the packet. The comparisons also allow construction and maintenance of a database that contains and associates PER information with power level information for one or more channels or RF frequencies. A higher bit energy (i.e., the maximum power value) represents higher background noise, and a higher PER. Accordingly, a maximum power value that exceeds multiple thresholds indicates a noisy channel. Thus, without actually decoding packets, the PER is estimated based on thresholds exceeded by the maximum power/energy value. The PER may be expressed as a number of packets that would have been correctly decoded versus a total number of packets.

At block 1402, power or energy are calculated in at least two streams of I/Q samples over a period of time. In the example of FIG. 7, power or energy are measured at block 708, such as by using a summation process. As seen in FIG. 6, there is a PER estimator 604-610 for each channel. By performing channel assessment for channels that are not being decoded, cleaner spectrum may be found for decoders currently using noisier spectrum. Accordingly, power or energy in at least two streams of I/Q samples may be calculated.

Block 1404 provides examples of the calculation of power or energy. In an example, power or energy may be calculated during a plurality of shorter periods of time over a longer period of time, wherein the shorter and the longer periods of time are based at last in part on a modulation scheme used by the radio. In a further example, power or energy may be calculated during a plurality of periods of time, each period being the period required to send a bit of data according to a modulation scheme in use and/or of interest. The calculations are repeated during a period of time required to send a packet of data according to the modulation scheme in use and/or of interest. Referring to the examples of FIGS. 5 and 6, the decoders 510-516 may not all be associated with the same modulation scheme.

At block 1406, for each packet-length period of time, a maximum power or energy from among the corresponding bit-length periods of time is determined. The maximum power or energy may represent a "burst" of interference, or alternatively, a level of interference that is slightly higher than other calculated power or energy levels.

At block 1408, for each I/Q sample stream and over the period of time, the determined maximum power or energy of the respective stream of I/Q samples are compared to at least one threshold. Referring to the example of FIG. 8, the incoming maximum bit-length (or other period of time) energy 616 is compared to the thresholds 802-806.

At block 1410, based at least in part on the comparing, a packet error rate is estimated for each stream of I/Q samples. In the example of FIG. 8, the output 814 shows which thresholds were exceeded by the incoming maximum energy value. The more threshold that were exceeded, the noisier the RF spectrum.

At block 1412, packet error rate is estimated by a packet error rate estimator using a same input as provided to a packet decoder (when the channel is in use and is actually being decoded). In the example of FIG. 5, the bifurcation of the signal at 526 allows the channel assessors (or PER estimators) to receive the same signal as the decoders. Thus, any errors, flaws or issues with the radio are "seen" by both the channel assessors/PER estimators and also by the decoders.

At block 1414, based at least in part on the estimating, the radio is changed or switched from a first channel plan to a second channel plan.

At block 1416, a database is maintained. The database may include some or all of the data associated with a plurality of channels. The channels may be a superset the first channel plan and the second channel plan. Some of the data, for at least one channel in the plurality of channels, may be derived from extrapolation of data obtained from the comparing of the calculated power or energy of I/Q samples over the period of time, to at least two thresholds. In an example, the CAT manager may maintain a database of PER information for each of a plurality of thresholds for each of a plurality of channels. In the examples of FIGS. 2 and 3, the database may be maintained on the system on a chip, or other location as indicated by design requirements.

Figure 15:
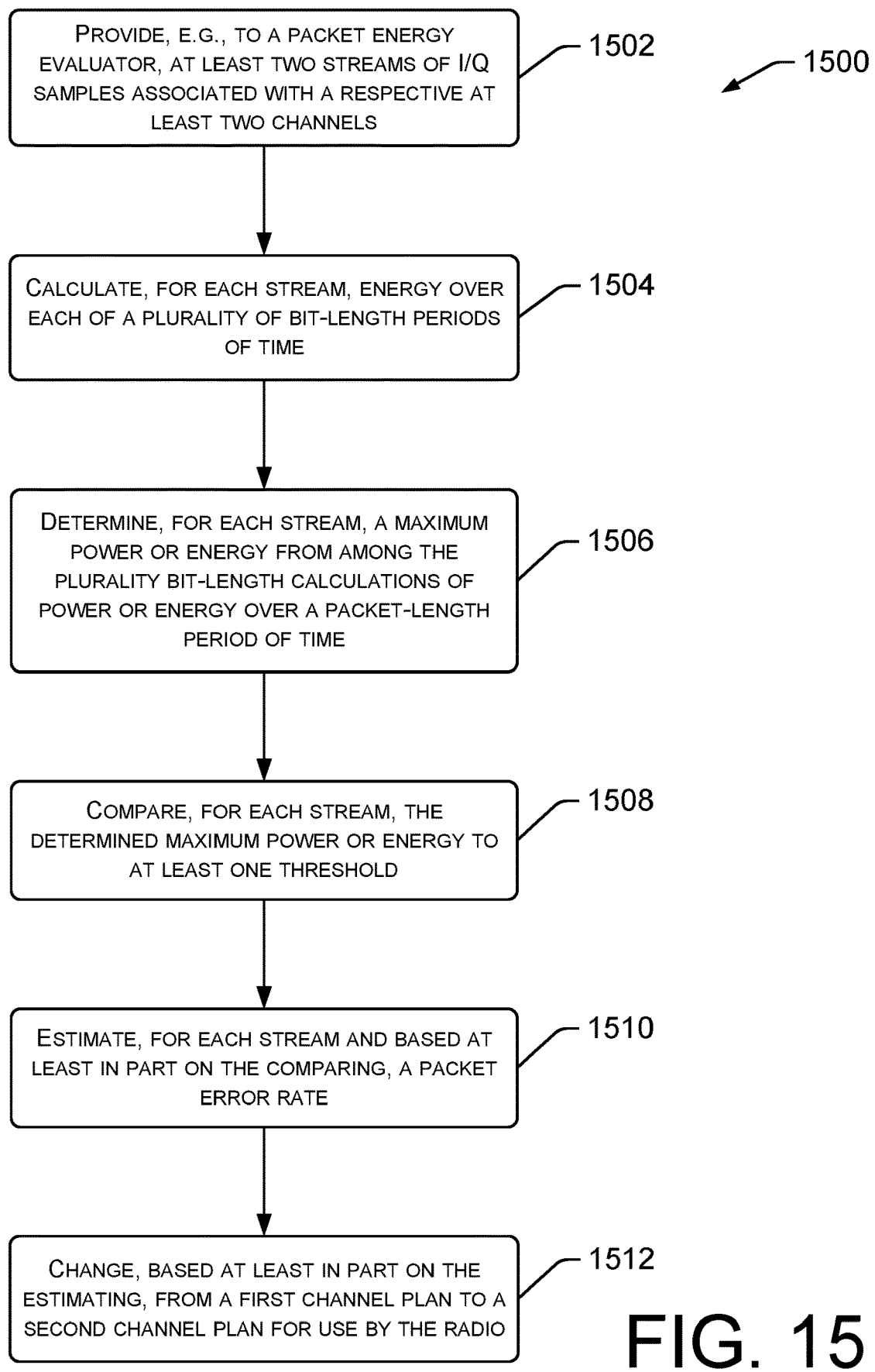
FIG. 15 is a flow diagram showing an example method by which a radio may estimate packet error rate of a plurality of channels, based in part on a comparison of power or energy of an I/Q sample stream and a plurality of thresholds.

FIG. 15 shows an example method 1500 by which a radio may estimate a packet error rate of a plurality of channels. In an example, the outcome of the PER estimator is based at least in part on determining a correctly-received packet count or percentage based on a variable value maxBitEnergy over the length of a packet being below the level threshold. The maxBitEnergy value over the length of the packet indicates the noise level on the channel, and when under a threshold, indicates that a packet on that channel at that time would have been successfully received if sent at a power level associated with the threshold. This determination is based on a comparison of energy levels (e.g., of signals and noise in a channel) and thresholds. The determination does not require transmission, reception, and/or decoding of actual packets.

At block 1502, at least two streams of I/Q samples associated with a respective at least two channels are obtained. In the example of FIG. 7, the streams 704 are provided to a packet energy evaluator 700 of a PER estimator (e.g., PER estimators 604-610 of FIG. 6).

At block 1504, for each stream, power or energy is calculated. The power or energy may be calculated for any desired period, and the calculations of that period may be repeated over any desired second period. In an example, the power or energy is calculated over each of a plurality of bit-length periods of time. In the example, the bit-length periods of time may be based on a time to transmit one bit using a modulation scheme. The calculating of power or energy over bit-length periods may be performed a plurality of times during a packet-length period of time based on a time required to transmit one packet using the modulation scheme. The measurement or calculation of power may be on-going, as channels continue to be assessed. In an example where the PER estimator is used for a single channel assessment, there is only one I/Q stream. Examples where multiple I/Q streams are utilized may result if multiple channel assessors are implemented.

At block 1506, for each stream, a maximum power or energy, which was calculated over a period, is determined. To continue the example, the maximum value is determined from among the plurality of calculations of power or energy over the respective plurality of bit-length periods of time, which were made during the packet-length period of time. Thus, the power or energy of a bit-length period of time, from among those bit-length periods of time during the packet-length period of time, and having the highest power or energy, is found. This is considered to be the "MaxBitEnergy" 710 of FIG. 7.

At block 1508, for each stream, the determined maximum power or energy for a period is compared to at least one threshold. The maximum power or energy for a bit-length period of time is the noisiest bit-length period during the packet length period of time. Each threshold may be associated with a power level of a transmitter and associated with a likelihood of a packet being received (i.e., a PER). Accordingly, if the maximum energy value exceeds the threshold, the noise on the RF channel would have prevented a packet, transmitted at a power level associated with the threshold, from being properly decoded. By having multiple thresholds, associated with multiple transmission power levels, curves can be developed that would indicate different packet error rates associated with different transmission power levels.

At block 1510, for each I/Q sample stream, and based at least in part on the comparing of block 1508, a packet error rate is estimated. Since the maximum power or energy value is a measure of noise (including self-interference) the more threshold values that the maximum power or energy exceeds, the noisier the RF channel. The PER can be estimated based at least in part on which thresholds the maximum energy value exceeds and does not exceed.

At block 1512, based at least in part on the estimating of block 1510, a first channel plan may be changed to a second channel plan for use by the radio.

Channel Assessment Techniques for Channel Plan Management

The example radios of FIGS. 1-11 combined a broadband digitizer, channelizers, decoders, and PER estimators. The radios provided simultaneous real-time channel assessment of multiple channels, while normal RF activities (e.g., sending and/or receiving messages) were also performed. By assessing multiple channels, relatively cleaner spectrum was continuously identified, and changes in channel plans responsive to the identified spectrum resulted in more efficient and effective network operation and RF spectrum use. Moreover, the channel assessment was performed using circuitry that considers both RF channel quality problems and also radio design and/or functionality problems. Accordingly, the channel assessment techniques consider both the RF spectrum and how that spectrum was used by a particular radio.

The example radios of FIGS. 6-8 additionally described a means of channel assessment described as PER estimation, which allowed assessment of channels without the need to send, receive, and/or decode packets. Accordingly, a radio having a different and more efficient design is used.

Figure 16:
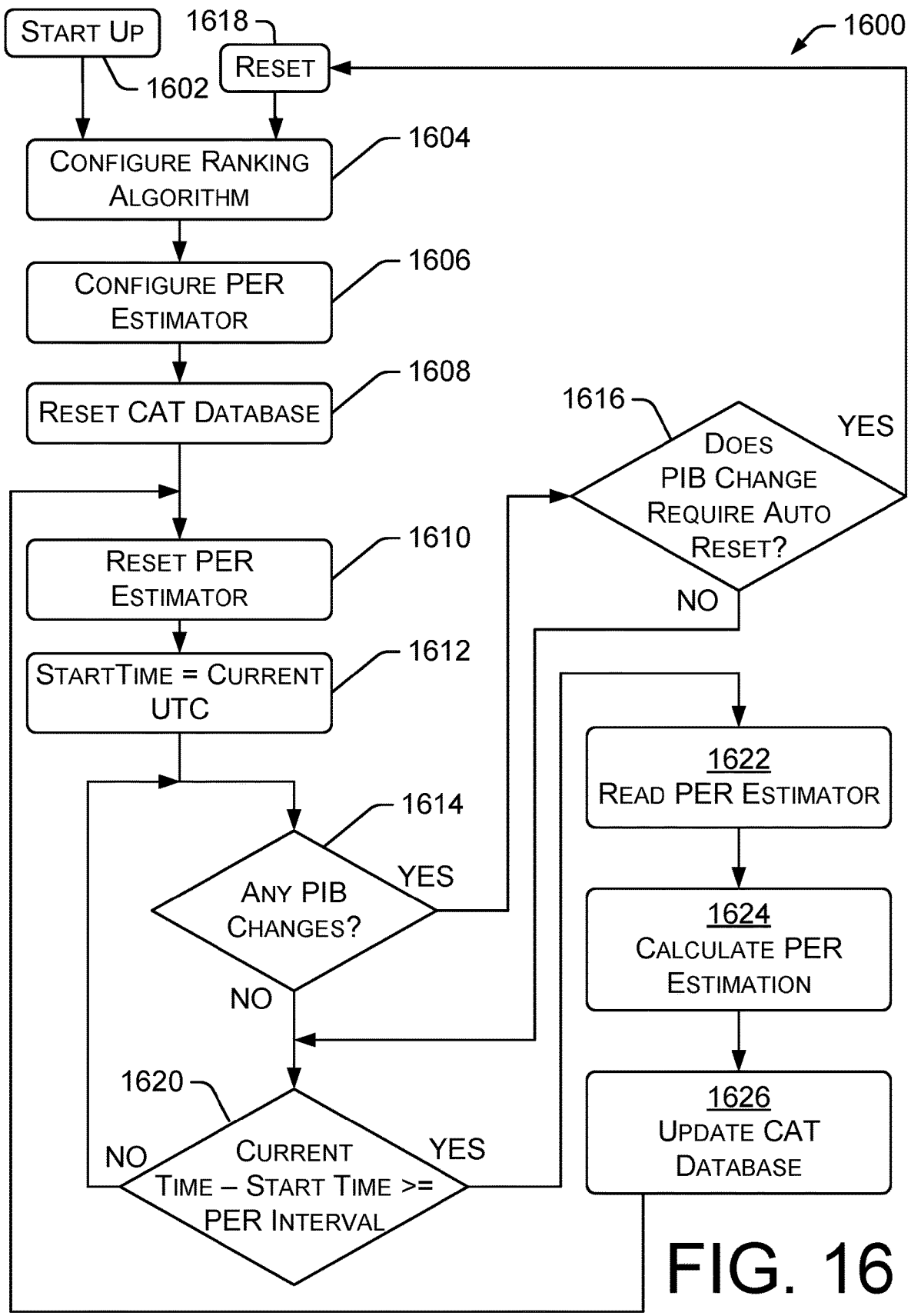
FIG. 16 is a flow diagram showing an example method by which a channel assessment tool (CAT) of a radio builds and/or maintains a database as part of a technique to control and manage a channel plan used by the radio and/or used by many devices within a radio network.

FIG. 16 shows operation of an example radio using an example method 1600 by which a channel assessment tool (CAT) of a radio assesses channel quality, estimates packet error rate (PER) builds and/or maintains a database as part of a technique to control and manage a channel plan used by the radio. Channel plan management enables a radio to select preferred channels within a potentially noisy radio frequency (RF) spectrum. In an example of RF spectrum analysis and channel plan management, a channel assessment tool analyzes RF spectrum, and builds and maintains a database that include RF spectrum, interference, noise and/or channel information. In an example, a CAT manager periodically collects the data from packet error rate (PER) estimators and resets them for a new collection interval. The CAT manager builds a statistical database for all channels. The database can be used to identify the best channels over that collection period, which is then ultimately used to build a new channel plan. The CAT statistical database to generate a new active channel plan which is ultimately updated across many or all devices within a radio network.

Referring to the example techniques of FIG. 16, a channel assessment tool (CAT) manager (e.g., CAT manager 226 of FIG. 2), has functionality and benefits in addition to those discussed above. In an example, the CAT manager allows for non-intrusive real-time analysis of channel ranking (e.g., based on RF noise including self-interference) with the added benefit of critical link statistics for all channels. Such analysis is performed without impacting the normal operation of the RF network, including channel monitoring, packet reception, and packet transmission. In a further example, the CAT manager capabilities can be extended to support the simultaneous analysis of multiple PHY modes that share a common channel plan. In a further example, the CAT manager can support the simultaneous analysis of multiple PHY modes that have dissimilar channel plans. In a still further example, the CAT manager creates a database that includes one or more of: mean PER for multiple power levels and multiple channels; standard deviation for multiple power levels and multiple channels; timestamping and recording of data; a channel ranking algorithm (and associated hardware for implementation) for all channels and modulation modes; and/or site quality metric(s) which may include a target power level in which the top x-number of channels perform better than a 50% PER (or settable PER). The routine can be configured to ignore blacklisted channels. The algorithm can be simultaneously performed on varying packet lengths, data rates, deviations, AM depths (e.g., this can be accomplished by instantiating multiple PER estimators on each channel). In a further example, the CAT manager provides metrics that can be used for functions including one or more of: real-time adaptive channel plan updates for the active network; real-time site location capacity and RF range capability; and/or real-time RF congestion monitoring.

In a further example, the CAT manager can provide early detection of critical RF network congestion by sending alarms to the field network director. The field network director can then use these alarms to trigger a service call to the site for reconciliation to eliminate or minimize downtime of the RF network.

In a further example, the CAT manager can provide logging which can be used for assessing congestion vs. time which is valuable for identifying and fixing time varying capacity problems.

Referring to FIG. 16 at block 1602, the channel assessment process starts. Referring to FIGS. 2 and 3, for the channel assessment process to operate, the receive/transmit switch 204 is set to receive.

At block 1604, a ranking algorithm is configured. In an example, the ranking algorithm may be configured by processing and configuring one or more Parameter Information Base (PIBs). In the example, the number of channels used in the ranking algorithm is set or indicated, and may be based on a PHY mode constant. The number of power levels used in PER estimation may be set, and may be based on a PHY mode constant. The interval at which the CAT manager will query the results and reset the PER estimator and update the relevant entries in the CAT database may be set. The method used by the ranking algorithm may be set. A target value for the PER results may be set for use by the ranking algorithm. In a further example, the ranking algorithm is configured to rank channels defined within RF spectrum according to their noise, interference, self-interference, traffic, etc. In the example, the configuration may clear previous data, and allow the channel assessment, channel ranking, channel plan ranking, etc., to be reevaluated.

At block 1606, the PER estimator is reconfigured. The PER estimator may be configured prior to any channel assessment session (e.g., a session defined by an interval defined by a variable time value). If any of these configuration properties ever change, such change may be assumed to invalidate the existing counter registers found in the FPGA and therefore requiring the PER estimator to be reset. This requirement is automatically handled by operation of the CAT manager. Referring to the examples of FIG. 6, the RX ON 518 is set to yes (i.e., receiver, as opposed to transmitter, is turned on), the PER reset 520 is asserted, the packet length 522 is entered, and the level-threshold settings 524 are provided. The level-threshold settings are values against which the maximum energy values are compared, and using which a PER determined for different transmission power levels. Referring to FIG. 7, a bitmask 702 may be provided to isolate particular bits in a sequence, when evaluating RF spectrum noise over bit-length periods of time during a packet-length period of time.

At block 1608, the CAT database is reset. In an example, the CAT service may be reset by issuance of a RESET command requested through an external interface. In a second example, an AUTO RESET may be automatically executed when certain or selected proxy ident function blocks (PIBs) have been changed. An AUTO RESET may be required in circumstances where the values in the database are no longer valid for these PIB settings. This case is expected to be an infrequent event. Referring to FIG. 8, an element 820 of the CAT database is seen, the database includes information regarding the maximum power or energy found from among a plurality of bit-length periods of time within packet-length periods of time, PER vs. transmission power level data, and/or associated channels, frequencies, channel plans, etc. Accordingly, data is accumulated over time, and this data is removed at reset.

At block 1610, the PER estimator is reset. Responsive to a reset, the PER estimator may start over, in part by setting all relevant counters to zero. Total energy may be calculated over a bit detection period. Based on the implementation of the downstream decoder, some of the samples on the bit boundaries may be discarded. Accordingly, the bit detection period may only include an amount of time used when interrogating a bit in the downstream decoder. This process may be handled by a bit mask, which is a mask of the samples equal to the mathematical length of the bit detection period used by the downstream decoders. The bit Energy can be calculated by convolving the I/Q samples over the bit detection period. Referring to the examples of FIG. 6, the receive on 518 is set to yes, the PER reset 520 is asserted, the packet length 522 is entered, and the level-threshold settings 524 are provided. The level-threshold settings allow the maximum energy values to be evaluated, and a PER determined for different transmission power levels. Referring to FIG. 7, a bitmask 702 may be provided to isolate particular bits in a sequence, when evaluating RF spectrum noise over bit-length periods of time.

At block 1612, the start time is set, such as to the current UTC time, the current local time, etc. The start time assists in the determination at block 1620 if sufficient bit-length periods of time have been assessed (to see if each is the maximum) in a packet-length period of time.

At block 1614, it is determined if a Parameter Information Base (PIB) requires changes and/or has been changed. PIB(s) can be changed through an external interface at any time. The CAT manager constantly monitors these changes. In an example, the PIB is a software block or component that may be used for RF identification systems. A PIB supports configuration of ident units, reading and writing data, and in some examples, status and command handling. If changes were indicated at block 1614, then at block 1616 it is determined if the PIB changes require a reset. The auto reset may be based on PIBs that are configured or defined to require or indicate an auto reset. If a reset is found to be required at block 1616, then at block 1618 a reset is performed, which may be similar to the actions performed by the start-up block 1602.

If a reset not found to be required at block 1616, or if there were no PIB changes at block 1614, then at block 1620 it is determined if the current time minus the starting time is greater than or equal to the PER interval. In an example, block 1620 determines if a PER interval period of time has been reached. In examples, the interval may be: a bit-length period of time (time required to transmit a bit of data in a relevant modulation scheme); a packet-length period of time (time required to transmit a packet of data in a relevant modulation scheme), or the interval may be an alternative period of time selected to satisfy design parameters.

If the PER interval has ended (as indicated by block 1620), then at block 1622 a PER estimator or calculator is read. In an example, the CAT manager reads PER estimator results from FPGA registers. By reading the PER estimator, it may be determined which thresholds (if any) have been exceeded by the maximum bit-energy level. In the example of FIG. 8, the PER estimator may be read by obtaining information from the level-threshold bank 800.

At block 1624, based at least in part on the reading of the PER estimator (e.g., as seen in FIGS. 7 and 8), the PER value and/or a PER estimated value may be calculated. The calculation can determine PER for each of a plurality of power levels on each of a plurality of channels.

At block 1626, using the information from the PER calculations, the CAT database may be updated. In an example update, update the following information in the CAT database: a variable indicating a number of updates may itself be updated (e.g., this number may be incremented by 1 every time there is an update to the database, while a RESET operation will set it to 0); a UTC timestamp of the last database reset may be updated; a UTC timestamp of the last database update may be updated; a ChanMEAN variable may be updated for all levels and channels (e.g., an update of a PER mean 2-dimensional vector with results for each channel and power level); a ChanVAR variable may be updated for all levels and channels (e.g., PER variance 2-dimensional vector with results for each channel and power level); and a vector of the radio's input referred power levels in which the PER performance is estimated may be updated. In a second example update, a channel and/or RF frequency and time may be recorded. The thresholds exceeded by the maximum power or energy value may be recorded. The PER associated with each threshold and each power or energy level may be recorded. The calculated PER, as function of a power level of transmission may be recorded for each of a plurality of power levels. After update, the CAT database may contain data including, or equivalent to, a graph or table of PER as a function of transmission power level for each of one or more channels, channel plans and/or RF frequencies.

The updated CAT database can be used to select a preferred channel and/or channel plan. The selection may be based on the RF noise and/or traffic on each channel. The CAT database may be updated, and the channel plan(s) in use may be revised, as indicated. Referring to FIG. 9, the channel selector(s) 914 may be used to reconfigure the channels provided to one or more decoders, which thereby changes the channels and/or channel plans in use.

After the CAT database is updated at block 1626, block 1610 is re-executed, and the PER estimator is reset.

Example Radios

In an example, a radio may be operated according to a method, which may include one or more of the following techniques. A radio band may be digitized to form a data stream. The data stream may be channelized to form a first in-phase in-quadrature (I/Q) sample stream of a first channel and to form a second I/Q sample stream of a second channel. The first I/Q sample stream may be provided to a first channel assessor for channel assessment. The first I/Q sample stream provided to a decoder to decode packets. In an example, a same portion of the first I/Q sample stream is presented to the first channel assessor and the decoder at the same time. The second I/Q sample stream may be provided to a second channel assessor for channel assessment. In an example, the second I/Q sample stream is assessed but is not decoded. Accordingly, it is assessed, but without the overhead of decoding. The method may additionally include changing from a first channel plan to a second channel plan for use by the radio based at least in part on output of the first channel assessor and based at least in part on output of the second channel assessor. The changing may include discontinuing providing the first I/Q sample stream to the decoder and providing the second I/Q sample stream to the decoder. The method may additionally include ranking the first channel and the second channel based at least in part on input from the first channel assessor and the second channel assessor. The method may additionally include bifurcating the first I/Q sample stream and providing the resulting two I/Q sample streams to the first channel assessor and the decoder. The method may additionally include assessment by the first channel assessor of the first channel and assessment of the second channel assessor of the second channel according to different modulation schemes. The method may additionally be performed when the first channel and the second channel occupy different bandwidths of the radio band. The method may additionally include operating the first and second channel assessors while output of only one decoder is used by the radio. The method may additionally include channelizing the data stream to define a plurality of channels including the first channel, the second channel, and other channels and performing channel assessment on the plurality of channels and decoding packets on only a subset of the plurality of channels. The method may additionally include assessing three or more channels simultaneously and decoding only one of the three or more channels, wherein the channel decoded is based at least in part on results of the simultaneous assessing of the three or more channels.

In an example, a radio may include several components, which may include one or more of the following. A radio frequency front end may be configured to digitize a radio band to form a data stream. At least two channelizers may be configured to channelize the data stream to form a first in-phase in-quadrature (I/Q) sample stream of a first channel and to form a second I/Q sample stream of a second channel. A first channel assessor may be configured to receive and to assess the first I/Q sample stream. A channel decoder may be configured to receive and to decode packets of the first I/Q sample stream. In an example, the first I/Q sample stream is presented to the first channel assessor and the channel decoder at the same time. A second channel assessor may be configured to receive and to assess the second I/Q sample stream. In an example, the second I/Q sample stream is assessed but is not decoded. A channel assessment manager may be configured to change from a first channel plan to a second channel plan for use by the radio based at least in part on output of the first channel assessor and based at least in part on output of the second channel assessor. In an example, the channel assessment manager may discontinue provision of the first I/Q sample stream to the channel decoder and provision of the second I/Q sample stream to the channel decoder. The radio may additionally be configured to have more channel assessors than channel decoders and the channel assessors assess channels without decoding incoming I/Q sample streams. In an example, the first channel assessor may assess the first channel according to a first modulation scheme, the second channel assessor assesses the second channel according to a second modulation scheme, and the first modulation scheme and the second modulation scheme may be different modulation schemes. In an example, the bandwidth represented by the first I/Q sample stream and bandwidth represented by the second I/Q sample stream may not be equal. In an example, the radio frequency front end is configured to digitize the radio band in the time domain and the radio band includes sufficient RF spectrum to define at least two channels, and channels from among the at least two channels occupy different bandwidths in the radio band.

In an example, a radio may be operated according to a method, which may include one or more of the following techniques. A radio band may be digitized to form a stream of data in the time domain. The stream of data may be channelized to result in an output of a first in-phase in-quadrature (I/Q) sample stream of a first channel and output of a second I/Q sample stream of a second channel. The first UQ sample stream may be provided to a first channel assessor for channel assessment and provided to a decoder to decode packets from the first I/Q sample stream. The second I/Q sample stream may be provided to a second channel assessor for channel assessment. Operation of the radio may be changed from use of a first channel plan to operation of the radio to use a second channel plan. The change may be based at least in part on output of the first channel assessor and the second channel assessor. In an example, the first I/Q sample stream is bifurcated and provided to both the first channel assessor and the decoder at the same time, i.e., in a parallel manner. In an example, the first channel assessor assesses the first channel and the second channel assessor assesses the second channel according to different modulation schemes. In an example, bandwidth represented by the first UQ sample stream and bandwidth represented by the second I/Q sample stream are not equal. In an example, the first channel and the second channel at least partially overlap over a portion of the digitized radio band and the first channel assessor assesses the first channel and the second channel assessor assesses the second channel according to different modulation schemes. In an example, operating the first and second channel assessors operate while only one channel decoder operates.

In an example, a radio may be operated according to a method, which may include one or more of the following techniques. Power or energy may be measured over bit-length periods of time in each of a first in-phase in-quadrature (I/Q) sample stream and a second I/Q sample stream. The measuring may be performed repeatedly over a packet-length period of time. For each I/Q sample stream a maximum power or energy value may be determined and/or found from among the bit-length periods of time within the packet-length period of time. For each I/Q sample stream, each determined maximum power or energy value may be compared to a threshold, and based at least in part on the comparing, a packet error rate for each stream of I/Q samples may be estimated. In an example, based at least in part on the estimating, operation of the radio may be changed from using a first channel plan to operation of the radio using a second channel plan. A first modulation scheme may be associated with the first I/Q sample stream and a second modulation scheme, different from the first modulation scheme, may be associated with the second I/Q sample stream. A length of the bit-length periods of time and the packet-length period of time, associated with the first I/Q sample stream, may be based at least in part on the first modulation scheme used by the first I/Q sample stream. A length of the bit-length periods of time and the packet-length period of time, associated with the second I/Q sample stream, may be based at least in part on the second modulation scheme used by the second I/Q sample stream. In an example, the bit-length periods of time and the packet-length period of time may both based at least in part on a modulation scheme used by the radio. In an example, power or energy may be measured over bit-length periods of time, such as by measuring bit power or energy using a summation process. In an example, the measuring of power or energy over bit-length periods of time may be performed by measuring bit power or energy using a convolution operation. In an example, a value used as the threshold is selected based at least in part on a modulation scheme used by the radio. In an example, the comparing, for each I/Q sample stream, of each determined maximum power or energy value to the threshold may be performed by comparing, for each I/Q sample stream, each determined maximum power or energy value to a plurality of thresholds. In an example, a single I/Q sample stream is decoded from among the first and second I/Q sample streams. Accordingly, a plurality of channels may be assessed without the overhead of decoding channels from which information (other than channel quality) is not required.

In an example, a radio may include several components, which may include one or more of the following. A channelizer may be configured to provide two or more in-phase in-quadrature (I/Q) sample streams associated with a respective two or more channels. Two or more packet error estimators to receive a respective stream of the two or more of I/Q sample streams. In the example, each packet error estimator configured for measuring power or energy of a respective I/Q sample stream over each of a plurality of bit-length periods of time, each bit-length period of time based on a time to transmit one bit using a modulation scheme, wherein cumulatively the bit-length periods of time comprise a packet-length period of time, and wherein the packet-length period of time is based on a period of time required to transmit one packet using the modulation scheme. Each packet error estimator may be configured to determine a maximum power or energy from among the plurality of measurements of power or energy over the plurality of bit-length periods of time. Each packet error estimator may be configured to compare the determined maximum power or energy to at least one threshold, and to estimate, based at least in part on the comparing, a packet error rate (PER) for a channel. In an example, a logic device may be configured for changing, for use by the radio and based at least in part on the estimating, from a first channel plan to a second channel plan. In an example, the comparing to the threshold includes comparing the determined maximum power or energy to a plurality of thresholds. In the example, each of the plurality of thresholds may indicate a likelihood that a packet transmitted during the packet-length period of time would have been received successfully at an energy level associated with a respective threshold from among the plurality of thresholds. In an example, the channelizer may provide a plurality of I/Q sample streams associated with a plurality of channels. The radio may additionally include a plurality of packet error estimators to assess each of the plurality of I/Q sample streams, respectively. In the example, at least some of the plurality of packet error estimators may comprise a level threshold bank with at least two thresholds. In an example, each of the packet error estimators may additionally be configured for comparing the determined maximum power or energy to at least two thresholds and estimating channel quality based on thresholds exceeded or not exceeded by the maximum power or energy as indicted by the comparing. In an example, the radio may include a plurality of packet error estimators and a single packet decoder.

In an example, a radio may be operated according to a method, which may include one or more of the following techniques, and may estimate packet error rate (PER). At least two in-phase in-quadrature (I/Q) sample streams, associated with a respective at least two channels, may be provided. For each stream, power or energy over each of a plurality of bit-length periods of time may be calculated. In an example, each bit-length period of time may be based on a time to transmit one bit using a modulation scheme of the stream. The calculating of the power or energy may be performed a plurality of times during a packet-length period of time based on a time required to transmit one packet using the modulation scheme of the stream. For each I/Q sample stream, a maximum power or energy may be calculated from among the plurality of calculations of power or energy over the plurality of bit-length periods of time. For each I/Q sample stream, the determined maximum power or energy may be compared to a threshold. For each I/Q sample stream and based at least in part on the comparing, a PER may be estimated, and based at least in part on the estimating, a first channel plan may be changed to a second channel plan for use by the radio. In an example, bit-length periods of time from among the plurality of bit-length periods of time may be selected to not overlap, and the threshold may be selected based at least in part on the modulation scheme. In an example, a sample rate of the at least two I/Q sample streams may be selected to be an integer multiple of a bit rate of each stream. In an example, a PER of each of a plurality of channels is assessed. The assessment may be based at least in part on the estimating of the PER, that are not decoded by the radio. In an example, the calculating of power or energy is performed by operating a convolution operation continuously over a plurality of samples from an I/Q sample stream in the packet-length period of time.

In an example, a radio may be operated according to a method, which may include one or more of the following techniques. Data associated with a plurality of channels from each of a respective plurality of packet error estimators is obtained. The obtained data may include a plurality of good packet counts. Each of the plurality of good packet counts may be incremented based on a maximum value of power or energy, from among bit-length periods of time over a packet-length period of time, not exceeding a threshold from among a plurality of threshold levels associated respectively with the plurality of channels. The obtained data may also include a total packet count, wherein the total packet count is incremented at intervals based on the packet-length period of time. The techniques of the method may include calculating estimated packet error rate (PER) data, wherein the calculating is based at least in part on the plurality of good packet counts and the total packet count for each of the plurality of channels. The techniques of the method may include updating a database to include the calculated estimated PER data for each of the plurality of channels. In an example, a channel plan may be updated based at least in part on the updated database. In an example, the total packet count may be incremented responsive to a last bit-length period of time within the packet-length period of time, wherein the last bit-length period of time does not indicate an actual end of an actual packet. In an example, calculating the estimated PER data may be performed by calculating a PER for each of the plurality of channels based at least in part on good packet counts associated with each threshold from among the plurality of threshold levels. In an example, calculating the estimated PER data may be performed by calculating a PER for each of a plurality of power levels associated with a respective threshold from among the plurality of thresholds. In an example, the plurality of threshold levels may be set such that the maximum power or energy found over the packet-length period of time exceeding each threshold indicates a noise level of a channel exceeding a power level of a transmission. In an example, updating the database may be performed by updating a timestamp of a last database reset or updating a timestamp of a last database update, and by updating results for the plurality of channels at each of the plurality of thresholds. In an example, the plurality of threshold levels may be associated with a plurality of noise levels on a channel, respectively.

In an example, a radio may include several components, which may include one or more of the following. A packet error estimator, which may be configured to calculate a plurality of good packet counts, wherein each of the plurality of good packet counts is incremented based on a maximum bit-length power or energy, found over a packet-length period of time, not exceeding a respective one of a plurality of threshold levels. The packet error estimator may also be configured to calculate a total packet count, wherein the total packet count is incremented responsive to a last bit-length period of the packet-length period of time. The packet error estimator may also be configured to calculate an estimated packet error rate (PER), wherein the estimated PER is based at least in part on the plurality of good packet counts and the total packet count, for each of a plurality of channels. The packet error estimator may also be configured to calculate an update for a database based at least in part the estimated PER for each of the plurality of channels. The radio may also include a receiver configured to update the channel plan used by the radio, based at least in part on the updated database. In an example, the plurality of threshold levels may be selected such that, if the maximum bit-length power or energy exceeds a threshold from among the plurality of threshold levels, a noise level of a channel has exceeded a respective power level of a transmission. In an example, the plurality of threshold levels may be selected such that, if the maximum bit-length power or energy fails to exceed a threshold from among the plurality of threshold levels, a packet transmission at a power level associated with the threshold would be successful. In an example, the packet error estimator is configured to calculate a PER for each of a plurality of power levels on each of the plurality of channels using the respective plurality of thresholds. In an example, the packet error estimator may be configured for calculating a PER for each of the plurality of channels based at least in part on good packet counts associated with the plurality of threshold levels. In an example, the database includes one or more of a timestamp of a last database reset, a timestamp of a last database update, and results for the plurality of channels at each of the plurality of thresholds.

In an example, a radio may be operated according to a method, which may include one or more of the following techniques. Data may be obtained from a plurality of channel assessors associated with a respective plurality of channels. A packet error rate (PER) may be calculated for each of the plurality of channels. The calculating may be based at least in part on the data from the plurality of channel assessors, and wherein the calculating is not based on input from a channel decoder. A database may be updated to include the calculated PER for each of the plurality of channels. A channel plan based may be updated at least in part on the calculated PER for each of the plurality of channels, wherein the updated channel plan indicates a selected channel. The selected channel may be decoded from among the plurality of channels according to the updated channel plan. In the example, obtaining the data may be obtained from the plurality of channel assessors by obtaining a plurality of good packet counts, wherein each of the plurality of good packet counts is incremented based on a maximum power or energy obtained over a plurality of bit-length period of time within a packet-length period of time not exceeding a respective one of a plurality of threshold levels. The data may also be obtained by obtaining a total packet count, wherein the total packet count is based on an end of the packet-length period of time, and wherein the bit-length period of time and the packet-length period of time are based on a same modulation scheme. In an example, the maximum power or energy over a bit-length period of time exceeding a threshold indicates a noise level of a channel exceeding a power level of a transmission. In an example, the maximum power or energy over a bit-length period of time failing to exceed a threshold indicates a power level that would result in successful packet transmission. In an example, calculating the PER for each of the plurality of channels may include calculating the PER for each of a plurality of power levels on each of a plurality of channels. In an example, calculating the PER may include calculating a PER for each of a plurality of channels and for each of a plurality of transmission energy or power levels.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method to operate a radio, comprising:
measuring power or energy over bit-length periods of time in each of a first in-phase in-quadrature (I/Q) sample stream and a second I/Q sample stream, wherein the measuring is performed repeatedly over a packet-length period of time;
determining, for each I/Q sample stream, a maximum power or energy value from among the bit-length periods of time within the packet-length period of time;
comparing, for each I/Q sample stream, each determined maximum power or energy value to a threshold; and
estimating, based at least in part on the comparing, a packet error rate for each stream of I/Q samples.

2. The method as recited in claim 1, additionally comprising:
changing, based at least in part on the estimating, operation of the radio using a first channel plan to operation of the radio using a second channel plan.

3. The method as recited in claim 1, wherein:
a first modulation scheme is associated with the first I/Q sample stream;
a second modulation scheme, different from the first modulation scheme, is associated with the second I/Q sample stream;
a length of the bit-length periods of time and the packet-length period of time, associated with the first I/Q sample stream, are based at least in part on the first modulation scheme used by the first I/Q sample stream; and
a length of the bit-length periods of time and the packet-length period of time, associated with the second I/Q sample stream, are based at least in part on the second modulation scheme used by the second I/Q sample stream.

4. The method as recited in claim 1, wherein:
the bit-length periods of time and the packet-length period of time are both based at least in part on a modulation scheme used by the radio.

5. The method as recited in claim 1, wherein measuring power or energy over bit-length periods of time comprises:
measuring bit power or energy using a summation process.

6. The method as recited in claim 1, wherein measuring power or energy over bit-length periods of time comprises:
measuring bit power or energy using a convolution operation.

7. The method as recited in claim 1, wherein a value used as the threshold is selected based at least in part on a modulation scheme used by the radio.

8. The method as recited in claim 1, wherein comparing, for each I/Q sample stream, each determined maximum power or energy value to the threshold comprises:
comparing, for each I/Q sample stream, each determined maximum power or energy value to a plurality of thresholds.

9. The method as recited in claim 1, additionally comprising:
decoding a single I/Q sample stream from among the first and second I/Q sample streams.

10. A radio, comprising:
a channelizer to provide two or more in-phase in-quadrature (I/Q) sample streams associated with a respective two or more channels;
two or more packet error estimators to receive a respective stream of the two or more of I/Q sample streams, each packet error estimator configured for:
measuring power or energy of a respective I/Q sample stream over each of a plurality of bit-length periods of time, each bit-length period of time based on a time to transmit one bit using a modulation scheme, wherein cumulatively the bit-length periods of time comprise a packet-length period of time, and wherein the packet-length period of time is based on a period of time required to transmit one packet using the modulation scheme;
determining a maximum power or energy from among the plurality of measurements of power or energy over the plurality of bit-length periods of time;
comparing the determined maximum power or energy to at least one threshold; and
estimating, based at least in part on the comparing, a packet error rate (PER) for a channel.

11. The radio as recited in claim 10, additionally comprising:
a logic device configured for changing, for use by the radio and based at least in part on the estimating, from a first channel plan to a second channel plan.

12. The radio as recited in claim 10, wherein the comparing comprises:
comparing the determined maximum power or energy to a plurality of thresholds, wherein each of the plurality of thresholds indicates a likelihood that a packet transmitted during the packet-length period of time would have been received successfully at an energy level associated with a respective threshold from among the plurality of thresholds.

13. The radio as recited in claim 10, wherein the channelizer provides a plurality of I/Q sample streams associated with a plurality of channels, and the radio additionally comprises:
a plurality of packet error estimators to assess each of the plurality of I/Q sample streams, respectively;
wherein at least some of the plurality of packet error estimators comprise a level threshold bank with at least two thresholds.

14. The radio as recited in claim 10, wherein each of the packet error estimators is additionally configured for:
comparing the determined maximum power or energy to at least two thresholds; and
estimating channel quality based on thresholds exceeded or not exceeded by the maximum power or energy as indicted by the comparing.

15. The radio as recited in claim 10, wherein the radio comprises a plurality of packet error estimators and a single packet decoder.

16. A method to estimate packet error rate (PER) of a radio, comprising:
providing at least two in-phase in-quadrature (I/Q) sample streams associated with a respective at least two channels;
calculating, for each stream, power or energy over each of a plurality of bit-length periods of time, each bit-length period of time based on a time to transmit one bit using a modulation scheme of the stream, wherein the calculating of the power or energy is performed a plurality of times during a packet-length period of time based on a time required to transmit one packet using the modulation scheme of the stream;
determining, for each I/Q sample stream, a maximum power or energy from among the plurality of calculations of power or energy over the plurality of bit-length periods of time;
comparing, for each I/Q sample stream, the determined maximum power or energy to a threshold;
estimating, for each I/Q sample stream and based at least in part on the comparing, a PER; and
changing, based at least in part on the estimating, from a first channel plan to a second channel plan for use by the radio.

17. The method as recited in claim 16, wherein:
bit-length periods of time from among the plurality of bit-length periods of time do not overlap; and
the threshold is selected based at least in part on the modulation scheme.

18. The method as recited in claim 16, wherein:
a sample rate of the at least two I/Q sample streams is an integer multiple of a bit rate of each stream.

19. The method as recited in claim 16, additionally comprising:
assessing a PER of a plurality of channels, based at least in part on the estimating, that are not decoded by the radio.

20. The method as recited in claim 16, wherein the calculating comprises:
operating a convolution operation continuously over a plurality of samples from an I/Q sample stream in the packet-length period of time.

* * * * *